US007487530B2

(12) United States Patent
Azami

(10) Patent No.: US 7,487,530 B2
(45) Date of Patent: Feb. 3, 2009

(54) METHOD AND APPARATUS FOR RANKING BROADCAST PROGRAMS

(75) Inventor: Tomohiro Azami, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 673 days.

(21) Appl. No.: 11/151,402

(22) Filed: Jun. 14, 2005

(65) Prior Publication Data
US 2006/0010464 A1 Jan. 12, 2006

(30) Foreign Application Priority Data
Jul. 9, 2004 (JP) ............................. 2004-202811
Apr. 28, 2005 (JP) ............................. 2005-131127

(51) Int. Cl.
*G06F 3/00* (2006.01)
*G06F 13/00* (2006.01)
*H04N 5/445* (2006.01)
(52) U.S. Cl. .......................................... 725/46; 725/47
(58) Field of Classification Search ...................... 725/9, 725/44, 45, 46, 47
See application file for complete search history.

(56) References Cited
U.S. PATENT DOCUMENTS
5,734,444 A * 3/1998 Yoshinobu ................... 725/14

2002/0188947 A1* 12/2002 Wang et al. .................. 725/45
2003/0061618 A1* 3/2003 Horiuchi et al. .............. 725/87
2004/0001081 A1* 1/2004 Marsh ......................... 345/721

FOREIGN PATENT DOCUMENTS
JP 08-180504 7/1996
JP 10-243309 9/1998

* cited by examiner

*Primary Examiner*—Ngoc K Vu
(74) *Attorney, Agent, or Firm*—Louis Woo

(57) ABSTRACT

Frequencies of viewing of first weekly broadcast programs by a user are detected in connection with past sections of the first weekly broadcast programs. At least one which has the detected viewing frequency greater than a predetermined threshold value is excluded from the first weekly broadcast programs to get second weekly broadcast programs. Program ranking measures representative of a relation between program attributes and user's preference are generated in response to (1) attributes of the past sections of the second weekly broadcast programs and (2) which of the past sections of the second weekly broadcast programs were viewed by the user. Future sections of the second weekly broadcast programs are ranked in response to (1) the generated program ranking measures and (2) attributes of the future sections of the second weekly broadcast programs.

14 Claims, 13 Drawing Sheets

FIG. 6

| ITEM | ATTRIBUTE VALUE | PREFERENCE DEGREE |
|---|---|---|
| GENRE | NEWS | 0.2 |
| | SPORTS | 0.48 |
| | DRAMA | 0.16 |
| PERFORMER LIST | HANAKO MIURA | 0.73 |
| | TARO YAMATO | 0.55 |
| | JIRO YOKOHAMA | 0.14 |
| KEYWORD | AMERICA | 0.36 |
| | HEALTH | 0.87 |
| | HOT SPRING | 0.49 |

METHOD AND APPARATUS FOR RANKING BROADCAST PROGRAMS

BACKGROUND OF THE INVENTION

1. Field of the Invention

This invention relates to a method and an apparatus for ranking broadcast programs in accordance with the preferences of a user of a television receiver.

2. Description of the Related Art

Many television programs are provided by BS broadcasting, CS broadcasting, and digital broadcasting. A user of a television receiver can select one from the television programs. As the number of broadcasted programs increases, it is more difficult for the user to comprehensively grasp what programs are being broadcasted. When broadcasted programs are so many, the user has some trouble in finding favorite one. In addition, there is a greater chance that the user may be unaware of the broadcasting of a favorite program and miss it.

Some television stations multiplex auxiliary program information with main television signals in order to help users of television receivers to select desired ones from many broadcast programs represented by the main television signals. The auxiliary program information represents the title, the on-air time, the on-air channel, the genre, the outline, and the performer list of each broadcast program.

Some television receivers employ the auxiliary program information to form electronic program guides. The displays of the television receivers indicate the electronic program guides to help users' choices of broadcast programs.

An advanced television receiver automatically generates a signal representing a history about the broadcast programs viewed by the user. The history signal includes the auxiliary program information concerning the viewed broadcast programs. The history signal is stored in a memory within the television receiver, and is updated from time to time. In the television receiver, the history signal is analyzed to decide user's preference (user's taste) in broadcast programs or what types of broadcast programs the user is interested in. The television receiver obtains auxiliary program information about forthcoming broadcast programs in advance. In the television receiver, the degrees of user's preference for the forthcoming broadcast programs are calculated from the obtained auxiliary program information and the results of the decision about the user's preference. The television receiver automatically selects ones, which may be preferred by the user, from the forthcoming broadcast programs according to the calculated degrees of user's preference.

Japanese patent application publication number 10-243309/1998 discloses a television channel selecting apparatus including a tuner and a demodulator. The demodulator separates each television signal received and selected by the tuner into a broadcast program and auxiliary program information representing a brief explanation of the contents of the broadcast program. For each broadcast program, a program evaluating section extracts keywords from the corresponding auxiliary program information. Then, the program evaluating section reads out the degrees of suitability of the extracted keywords for a viewer from a filtering-parameter storing and updating section. Subsequently, the program evaluating section calculates the sum of the read-out degrees of suitability as an indication of an evaluation value for the broadcast program. These steps are executed for each of viewable channels so that the evaluation values for the broadcast programs on the respective channels are obtained. The channels are ranked in accordance with the obtained evaluation values. Specifically, a program presenting section makes the images of the respective channels into a texture, and pastes the texture in a three-dimensional space while placing the broadcast program of a high evaluation value on the fore side.

In the apparatus of Japanese application 10-243309/1998, the filtering-parameter storing and updating section holds a list of predetermined keywords and the degrees of suitability of the predetermined keywords for a user. The extracted keywords are collated with the predetermined keywords to find ones of the predetermined keywords which match the extracted keywords. The degrees of suitability of the matching keywords are used as those of the extracted keywords. The degree of suitability varies from keyword to keyword. In addition, the degree of suitability of at least one of the predetermined keywords can be updated depending on the length of time during which the user continues to select a broadcast program corresponding to auxiliary program information having a keyword matching the predetermined keyword. Furthermore, the list of predetermined keywords depends on whether the user is a father, a mother, or a child.

In the apparatus of Japanese application 10-243309/1998, the updating of the degrees of suitability of the predetermined keywords does not consider how much the user concentrates on viewing related broadcast programs. Even conditions where a broadcast program remains selected for a long time while the user continues to read a book are considered in the updating of the degrees of suitability of related keywords. This fact causes a decrease in the reliability of the ranking of the channels.

Japanese patent application publication number 8-180504/1996 discloses a broadcast receiving apparatus designed to induce a user to watch a regular broadcast program usually accessed by the user. The broadcast receiving apparatus generates channel history information representing conditions of user's selection of program-corresponding channels as a function of a day of week and the time of day for a prescribed number of weeks up to the last week. The generated channel history information is stored in a memory, and is updated from time to time. The channel history information in the memory is searched for a channel corresponding to a user's favorite program, that is, a weekly broadcast program selected by the user at higher than a threshold frequency. In the case where such a channel is present, a received broadcast signal of the channel is automatically recorded on a recording medium at the scheduled time. Therefore, even when the user has missed the user's favorite program corresponding to the channel, it is possible to reproduce the user's favorite program from the recording medium.

SUMMARY OF THE INVENTION

It is a first object of this invention to provide an apparatus for reliably ranking broadcast programs in accordance with the preferences of a user of a television receiver.

It is a second object of this invention to provide a method of reliably ranking broadcast programs in accordance with the preferences of a user of a television receiver.

A first aspect of this invention provides an apparatus for ranking broadcast programs accompanied with auxiliary program information. The apparatus comprises first means for generating a viewing history about broadcast programs viewed by a user in the past; second means for obtaining auxiliary program information accompanying broadcast programs; third means for calculating at least a degree of suitability of user's preference for each of the broadcast programs from the viewing history generated by the first means and the auxiliary program information obtained by the second means; fourth means for setting decision measures in response to the suitability degrees calculated by the third means for the respective broadcast programs and the viewing history generated by the first means, the decision measures being for decisions each about which of two of future broadcast programs more suits to user's preference; and fifth means for ranking the future broadcast programs in response to the decision measures set by the fourth means. The fourth means comprises (1) means for selecting one from past broadcast programs corresponding to the viewing history as a viewed broadcast program, (2) means for setting the suitability degree for the viewed broadcast program as first information, (3) means for setting the suitability degree for a non-viewed broadcast program not viewed by the user and having an on-air time range equal to that of the viewed broadcast program as second information, (4) means for generating third information representing that the user selected the viewed broadcast program rather than the non-viewed broadcast program, (5) means for applying the operation of the means (1), (2), (3), and (4) to each of all possible pairs of viewed broadcast programs and non-viewed broadcast programs to obtain the first information, the second information, and the third information for all the possible pairs, and (6) means for setting the decision measures in response to the obtained first, second, and third information. The fifth means comprises (7) means for selecting two from the future broadcast programs as paired future broadcast programs, (8) means for deciding which of the paired future broadcast programs more suits to user's preference in response to the suitability degrees for the paired future broadcast programs and the decision measures, (9) means for applying the operation of the means (7) and (8) to each of all possible pairs of the future broadcast programs to obtain results of the deciding, (10) means for calculating a per-program number of times each of the future broadcast programs is decided to more suit to user's preference by referring to the obtained results of the deciding, and (11) means for ranking the future broadcast programs in accordance with the calculated per-program numbers of times.

A second aspect of this invention is based on the first aspect thereof, and provides an apparatus further comprising sixth means for calculating a frequency of viewing of each of broadcast programs corresponding to the auxiliary program information on the basis of the viewing history. The fourth means comprises (1) means for selecting one from the past broadcast programs corresponding to the viewing history as a viewed broadcast program, (2) means for setting the suitability degree for the viewed broadcast program and the viewing frequency of the viewed broadcast program as first information, (3) means for setting the suitability degree for a non-viewed broadcast program not viewed by the user and having an on-air time range equal to that of the viewed broadcast program, and the viewing frequency of the non-viewed broadcast program as second information, (4) means for generating third information representing that the user selected the viewed broadcast program rather than the non-viewed broadcast program, (5) means for applying the operation of the means (1), (2), (3), and (4) to each of all possible pairs of viewed broadcast programs and non-viewed broadcast programs to obtain the first information, the second information, and the third information for all the possible pairs, and (6) means for setting the decision measures in response to the obtained first, second, and third information. The fifth means comprises (7) means for selecting two from the future broadcast programs as paired future broadcast programs, (8) means for deciding which of the paired future broadcast programs more suits to user's preference in response to the suitability degrees for the paired future broadcast programs, the viewing frequencies of past broadcast programs corresponding to the paired future broadcast programs, and the decision measures, (9) means for applying the operation of the means (7) and (8) to each of all possible pairs of the future broadcast programs to obtain results of the deciding, (10) means for calculating a per-program number of times each of the future broadcast programs is decided to more suit to user's preference by referring to the obtained results of the deciding, and (11) means for ranking the future broadcast programs in accordance with the calculated per-program numbers of times.

A third aspect of this invention is based on the second aspect thereof, and provides an apparatus further comprising seventh means for detecting ones among the broadcast programs corresponding to the auxiliary program information which have the viewing frequencies greater than a predetermined threshold value; and eighth means for preventing the broadcast programs detected by the seventh means from being used by the fourth means and the fifth means.

A fourth aspect of this invention provides an apparatus for ranking broadcast programs accompanied with auxiliary program information having a plurality of items per broadcast program. Each of the items has at least one or more attribute values. The apparatus comprises first means for generating a viewing history about broadcast programs viewed by a user in the past; second means for obtaining auxiliary program information accompanying broadcast programs; third means for calculating frequencies of appearance of the attribute values in the items regarding the broadcast programs corresponding to the viewing history; fourth means for calculating degrees of user's preference for the respective broadcast programs corresponding to the auxiliary program information from the appearance frequencies calculated by the third means for each of the attribute values; fifth means for adding the preference degrees calculated by the fourth means on an item-by-item basis to generate degrees of suitability of user's preference for the respective broadcast programs; sixth means for setting decision measures in response to the suitability degrees generated by the fifth means for the respective broadcast programs and the viewing history generated by the first means, the decision measures being for decisions each about which of two of future broadcast programs more suits to user's preference; and seventh means for ranking the future broadcast programs in response to the decision measures set by the sixth means. The sixth means comprises (1) means for selecting one from past broadcast programs corresponding to the viewing history as a viewed broadcast program, (2) means for setting the suitability degree for the viewed broadcast program as first information, (3) means for setting the suitability degree for a non-viewed broadcast program not viewed by the user and having an on-air time range equal to that of the viewed broadcast program as second information, (4) means for generating third information representing that the user selected the viewed broadcast program rather than the non-viewed broadcast program, (5) means for applying the operation of the means (1), (2), (3), and (4) to each of all possible pairs of viewed broadcast programs and non-viewed broadcast programs to obtain the first information, the second information, and the third information for all the possible pairs, and (6) means for setting the decision measures in response to the obtained first, second, and third information. The seventh means comprises (7) means for selecting two from the future broadcast programs as paired future broadcast programs, (8) means for deciding which of the paired future broadcast programs more suits to user's preference in response to the suitability degrees for the paired future broadcast programs and the decision measures, (9) means for applying the operation of the means (7) and (8) to each of all possible pairs of the future broadcast programs to obtain results of the deciding, (10) means for calculating a per-program number of times each of the future broadcast programs is decided to more suit to user's preference by referring to the obtained results of the deciding, and (11) means for ranking the future broadcast programs in accordance with the calculated per-program numbers of times.

A fifth aspect of this invention is based on the fourth aspect thereof, and provides an apparatus further comprising eighth means for calculating a frequency of viewing of each of broadcast programs corresponding to the auxiliary program information on the basis of the viewing history. The sixth means comprises (1) means for selecting one from the past broadcast programs corresponding to the viewing history as a viewed broadcast program, (2) means for setting the suitability degree for the viewed broadcast program and the viewing frequency of the viewed broadcast program as first information, (3) means for setting the suitability degree for a non-viewed broadcast program not viewed by the user and having an on-air time range equal to that of the viewed broadcast program, and the viewing frequency of the non-viewed broadcast program as second information, (4) means for generating third information representing that the user selected the viewed broadcast program rather than the non-viewed broadcast program, (5) means for applying the operation of the means (1), (2), (3), and (4) to each of all possible pairs of viewed broadcast programs and non-viewed broadcast programs to obtain the first information, the second information, and the third information for all the possible pairs, and (6) means for setting the decision measures in response to the obtained first, second, and third information. The seventh means comprises (7) means for selecting two from the future broadcast programs as paired future broadcast programs, (8) means for deciding which of the paired future broadcast programs more suits to user's preference in response to the suitability degrees for the paired future broadcast programs, the viewing frequencies of past broadcast programs corresponding to the paired future broadcast programs, and the decision measures, (9) means for applying the operation of the means (7) and (8) to each of all possible pairs of the future broadcast programs to obtain results of the deciding, (10) means for calculating a per-program number of times each of the future broadcast programs is decided to more suit to user's preference by referring to the obtained results of the deciding, and (11) means for ranking the future broadcast programs in accordance with the calculated per-program numbers of times.

A sixth aspect of this invention is based on the fifth aspect thereof, and provides an apparatus further comprising ninth means for detecting ones among the broadcast programs corresponding to the auxiliary program information which have the viewing frequencies greater than a predetermined threshold value; and tenth means for preventing the broadcast programs detected by the ninth means from being used by the sixth means and the seventh means.

A seventh aspect of this invention provides a method of ranking broadcast programs accompanied with auxiliary program information. The method comprises the steps of generating a viewing history about broadcast programs viewed by a user in the past; obtaining auxiliary program information accompanying broadcast programs; calculating at least a degree of suitability of user's preference for each of the broadcast programs from the viewing history and the auxiliary program information; setting decision measures in response to the suitability degrees for the respective broadcast programs and the viewing history, the decision measures being for decisions each about which of two of future broadcast programs more suits to user's preference; and ranking the future broadcast programs in response to the decision measures. The decision-reference setting step comprises (1) selecting one from past broadcast programs corresponding to the viewing history as a viewed broadcast program, (2) setting the suitability degree for the viewed broadcast program as first information, (3) setting the suitability degree for a non-viewed broadcast program not viewed by the user and having an on-air time range equal to that of the viewed broadcast program as second information, (4) generating third information representing that the user selected the viewed broadcast program rather than the non-viewed broadcast program, (5) applying the operation (1), (2), (3), and (4) to each of all possible pairs of viewed broadcast programs and non-viewed broadcast programs to obtain the first information, the second information, and the third information for all the possible pairs, and (6) setting the decision measures in response to the obtained first, second, and third information. The ranking step comprises (7) selecting two from the future broadcast programs as paired future broadcast programs, (8) deciding which of the paired future broadcast programs more suits to user's preference in response to the suitability degrees for the paired future broadcast programs and the decision measures, (9) applying the operation (7) and (8) to each of all possible pairs of the future broadcast programs to obtain results of the deciding, (10) calculating a per-program number of times each of the future broadcast programs is decided to more suit to user's preference by referring to the obtained results of the deciding, and (11) ranking the future broadcast programs in accordance with the calculated per-program numbers of times.

An eighth aspect of this invention is based on the seventh aspect thereof, and provides a method further comprising the step of calculating a frequency of viewing of each of broadcast programs corresponding to the auxiliary program information on the basis of the viewing history. The decision-reference setting step comprises (1) selecting one from the past broadcast programs corresponding to the viewing history as a viewed broadcast program, (2) setting the suitability degree for the viewed broadcast program and the viewing frequency of the viewed broadcast program as first information, (3) setting the suitability degree for a non-viewed broadcast program not viewed by the user and having an on-air time range equal to that of the viewed broadcast program, and the viewing frequency of the non-viewed broadcast program as second information, (4) generating third information representing that the user selected the viewed broadcast program rather than the non-viewed broadcast program, (5) applying the operation (1), (2), (3), and (4) to each of all possible pairs of viewed broadcast programs and non-viewed broadcast programs to obtain the first information, the second information, and the third information for all the possible pairs, and (6) setting the decision measures in response to the obtained first, second, and third information. The ranking step comprises (7) selecting two from the future broadcast programs as paired future broadcast programs, (8) deciding which of the paired future broadcast programs more suits to user's preference in response to the suitability degrees for the paired future broadcast programs, the viewing frequencies of past broadcast programs corresponding to the paired future broadcast programs, and the decision measures, (9) applying the operation (7) and (8) to each of all possible pairs of the future broadcast programs to obtain results of the deciding, (10) calculating a per-program number of times each of the future broadcast programs is decided to more suit to user's preference by referring to the obtained results of the deciding, and (11)

ranking the future broadcast programs in accordance with the calculated per-program numbers of times.

A ninth aspect of this invention is based on the eighth aspect thereof, and provides a method further comprising the steps of detecting ones among the broadcast programs corresponding to the auxiliary program information which have the viewing frequencies greater than a predetermined threshold value; and preventing the detected broadcast programs from being used by the decision-reference setting step and the ranking step.

A tenth aspect of this invention provides a method of ranking broadcast programs accompanied with auxiliary program information having a plurality of items per broadcast program. Each of the items has at least one or more attribute values. The method comprises the steps of generating a viewing history about broadcast programs viewed by a user in the past; obtaining auxiliary program information accompanying broadcast programs; calculating frequencies of appearance of the attribute values in the items regarding the broadcast programs corresponding to the viewing history; calculating degrees of user's preference for the respective broadcast programs corresponding to the auxiliary program information from the appearance frequencies for each of the attribute values; adding the preference degrees on an item-by-item basis to generate degrees of suitability of user's preference for the respective broadcast programs; setting decision measures in response to the suitability degrees for the respective broadcast programs and the viewing history, the decision measures being for decisions each about which of two of future broadcast programs more suits to user's preference; and ranking the future broadcast programs in response to the decision measures. The decision-reference setting step comprises (1) selecting one from past broadcast programs corresponding to the viewing history as a viewed broadcast program, (2) setting the suitability degree for the viewed broadcast program as first information, (3) setting the suitability degree for a non-viewed broadcast program not viewed by the user and having an on-air time range equal to that of the viewed broadcast program as second information, (4) generating third information representing that the user selected the viewed broadcast program rather than the non-viewed broadcast program, (5) applying the operation (1), (2), (3), and (4) to each of all possible pairs of viewed broadcast programs and non-viewed broadcast programs to obtain the first information, the second information, and the third information for all the possible pairs, and (6) setting the decision measures in response to the obtained first, second, and third information. The ranking step comprises (7) selecting two from the future broadcast programs as paired future broadcast programs, (8) deciding which of the paired future broadcast programs more suits to user's preference in response to the suitability degrees for the paired future broadcast programs and the decision measures, (9) applying the operation of the means (8) and (9) to each of all possible pairs of the future broadcast programs to obtain results of the deciding, (10) calculating a per-program number of times each of the future broadcast programs is decided to more suit to user's preference by referring to the obtained results of the deciding, and (11) ranking the future broadcast programs in accordance with the calculated per-program numbers of times.

An eleventh aspect of this invention is based on the tenth aspect thereof, and provides a method further comprising the step of calculating a frequency of viewing of each of broadcast programs corresponding to the auxiliary program information on the basis of the viewing history. The decision-reference setting step comprises (1) selecting one from the past broadcast programs correspond to the viewing history as a viewed broadcast program, (2) setting the suitability degree for the viewed broadcast program and the viewing frequency of the viewed broadcast program as first information, (3) setting the suitability degree for a non-viewed broadcast program not viewed by the user and having an on-air time range equal to that of the viewed broadcast program, and the viewing frequency of the non-viewed broadcast program as second information, (4) generating third information representing that the user selected the viewed broadcast program rather than the non-viewed broadcast program, (5) applying the operation (1), (2), (3), and (4) to each of all possible pairs of viewed broadcast programs and non-viewed broadcast programs to obtain the first information, the second information, and the third information for all the possible pairs, and (6) setting the decision measures in response to the obtained first, second, and third information. The ranking step comprises (7) selecting two from the future broadcast programs as paired future broadcast programs, (8) deciding which of the paired future broadcast programs more suits to user's preference in response to the suitability degrees for the paired future broadcast programs, the viewing frequencies of past broadcast programs corresponding to the paired future broadcast programs, and the decision measures, (9) applying the operation (7) and (8) to each of all possible pairs of the future broadcast programs to obtain results of the deciding, (10) calculating a per-program number of times each of the future broadcast programs is decided to more suit to user's preference by referring to the obtained results of the deciding, and (11) ranking the future broadcast programs in accordance with the calculated per-program numbers of times.

A twelfth aspect of this invention is based on the eleventh aspect thereof, and provides a method further comprising the steps of detecting ones among the broadcast programs corresponding to the auxiliary program information which have the viewing frequencies greater than a predetermined threshold value; and preventing the detected broadcast programs from being used by the decision-reference setting step and the ranking step.

A thirteenth aspect of this invention provides an apparatus for ranking broadcast programs. The apparatus comprises first means for detecting frequencies of viewing of first weekly broadcast programs by a user in connection with past sections of the first weekly broadcast programs; second means for detecting at least one among the first weekly broadcast programs which has the detected viewing frequency greater than a predetermined threshold value; third means for excluding the one detected by the second means from the first weekly broadcast programs to get second weekly broadcast programs; fourth means for obtaining attributes of the past sections of the second weekly broadcast programs; fifth means for detecting which of the past sections of the second weekly broadcast programs were viewed by the user; sixth means for generating program ranking measures representative of a relation between program attributes and user's preference in response to (1) the obtained attributes of the past sections of the second weekly broadcast programs and (2) which of the past sections of the second weekly broadcast programs were viewed by the user; seventh means for obtaining attributes of future sections of the second weekly broadcast programs; and eighth means for ranking the future sections of the second weekly broadcast programs in response to (1) the generated program ranking measures and (2) the obtained attributes of the future sections of the second weekly broadcast programs.

A fourteenth aspect of this invention provides a method of ranking broadcast programs. The method comprises the steps of detecting frequencies of viewing of first weekly broadcast programs by a user in connection with past sections of the first weekly broadcast programs; detecting at least one among the first weekly broadcast programs which has the detected viewing frequency greater than a predetermined threshold value; excluding the detected one from the first weekly broadcast programs to get second weekly broadcast programs; obtaining attributes of the past sections of the second weekly broadcast programs; detecting which of the past sections of the second weekly broadcast programs were viewed by the user; generating program ranking measures representative of a relation between program attributes and user's preference in response to (1) the obtained attributes of the past sections of the second weekly broadcast programs and (2) which of the past sections of the second weekly broadcast programs were viewed by the user; obtaining attributes of future sections of the second weekly broadcast programs; and ranking the future sections of the second weekly broadcast programs in response to (1) the generated program ranking measures and (2) the obtained attributes of the future sections of the second weekly broadcast programs.

This invention has the following advantages. In this invention, the genre and the performer list of each broadcast program are handled as items. Also, there is a keyword item. The degree of the suitability of user's preference for each broadcast program is calculated for each of the items. A history of the viewing of past broadcast programs is made. References for decisions about future broadcast programs are set on the basis of the per-item suitability degrees and the viewing history. The decision measures are updated from time to time.

The future broadcast programs are ranked in response to the decision measures. The decision measures are optimized into harmony with user's inclination concerning program selection. The final degree of the suitability of user's preference for each broadcast program is calculated from the related per-item suitability degrees in accordance with the optimized decision measures. The calculated final suitability degrees are used for the ranking of the future broadcast programs.

Each of the items has an attribute value or values (a member or members). An artificial neural network is utilized to determine the decision measures. The artificial neural network is subjected to a learning procedure, and consequently the following decision measures are generated. In the case where the user preferentially views news programs which are denoted by a genre-item attribute value of "news", the generated decision measures make higher the final degree of the suitability of user's preference for each broadcast program corresponding to a high per-item suitability degree about the genre item regardless of per-item suitability degrees about the performer list item and the keyword item. Accordingly, there is a greater chance that a news program exclusive of interesting attribute values in the performer list item and the keyword item and a news program inclusive thereof are in similar places as a result of the program ranking.

Therefore, it is possible to increase the accuracy of the analysis of user's preference and also the accuracy of the program ranking.

This invention may utilize the viewing frequencies of past broadcast programs. Specifically, the measures for the decisions about the future broadcast programs are set on the basis of the viewing frequencies in addition to the per-item suitability degrees and the viewing history.

Thus, the viewing frequencies are reflected in the program ranking. Accordingly, in the case where the user views a certain weekly broadcast program every week, the program ranking tends to locate the certain weekly broadcast program at a former place regardless of the performer list item and the keyword item corresponding thereto.

Therefore, it is possible to further increase the accuracy of the analysis of user's preference and also the accuracy of the program ranking.

This invention may exclude weekly broadcast programs viewed by the user with low degrees of concentration from the calculation of the per-item suitability degrees. In this case, it is possible to prevent uninteresting weekly broadcast programs from being used for the analysis of user's preference.

The actual degree of user's preference for a weekly broadcast program viewed by the user every week with a low degree of concentration is relatively low although that program scores a high viewing frequency. Such a weekly broadcast program is excluded from the analysis of user's preference.

Therefore, it is possible to further increase the accuracy of the analysis of user's preference and also the accuracy of the program ranking.

BRIEF DESCRIPTION OF THE DRAWINGS

FIG. 6 is a diagram of an example of the relation among items, attribute values (item members), and user's preference degrees.

DETAILED DESCRIPTION OF THE INVENTION

Figure 1:
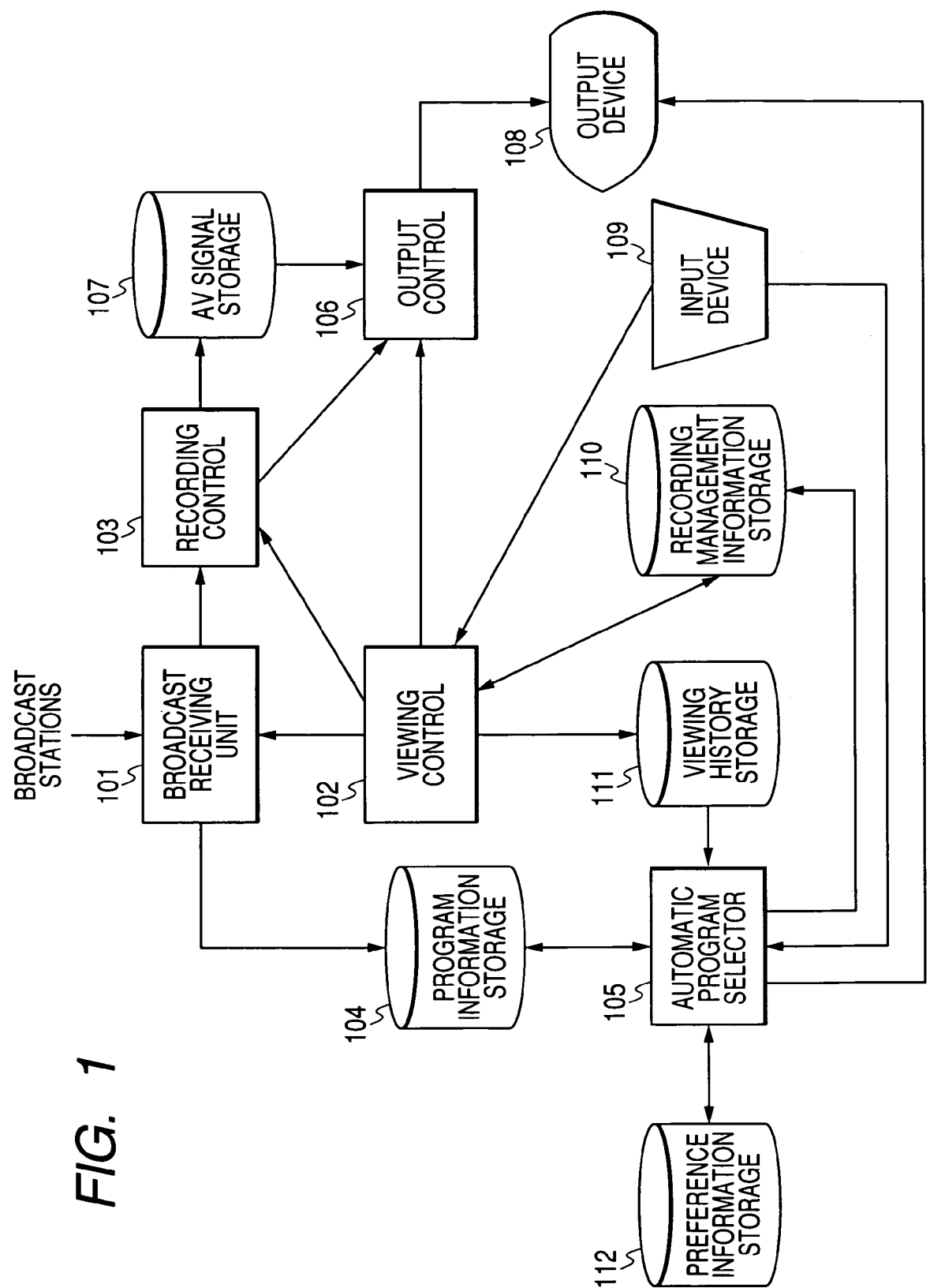
FIG. 1 is a block diagram of an automatic program selecting apparatus including a program ranking apparatus according to an embodiment of this invention.

A television broadcast system according to an embodiment of this invention includes television stations and television receivers. The television stations broadcast television signals representative of broadcast programs (television programs) while the television receivers catch the broadcasted television signals. The television stations multiplex auxiliary program information with main television signals representative of the broadcast programs to form program-information-added television signals. The television stations broadcast the program-information-added television signals. The auxiliary program information represents items concerning each broadcast program, for example, the title, the on-air time, the on-air channel, the genre, the outline (the brief explanation), and the performer list of the broadcast program.

Each television receiver separates the received television signals into the main television signals and the auxiliary program information. The television receiver indicates the auxiliary program information on its display. The indicated auxiliary program information helps a user of the television receiver to select desired ones from the broadcast programs represented by the main television signals.

Broadcast programs (television programs) handled in the embodiment of this invention include weekly ones, that is, regular ones broadcasted on a fixed day of week and at a fixed time of day. A first example of a weekly broadcast program is a serial drama in installments assigned to respective weeks. A second example of a weekly broadcast program is a variety show, the contents of which vary from week to week.

The broadcast programs handled in the embodiment of this invention may include ones of types different from the weekly type.

In more detail, broadcast programs used in the description of the embodiment of this invention are as follows. A first episode, a second episode, . . . , and a last episode broadcasted on same days of weeks, such as those in a serial drama, are handled as a same program. In the case of a serial drama "Jiro monogatari" composed of 11 episodes, all the 11 episodes are handled as a same program "Jiro monogatari". At a time point after the broadcasting of the first and second episodes in this drama has been completed, each of the first and second episodes is called a past broadcasted program of the program "Jiro monogatari". Each of the third and later episodes which are planned to be broadcasted in future is called a future broadcast planned program of the program "Jiro monogatari".

According to another example, programs broadcasted on same days of weeks and a same channel with similar contents are handled as a same program. In the case of a variety program called "Owarai gassen" and broadcasted at 8 o'clock of every Saturday on 8 channel, "Owarai gassen" broadcasted on any Saturday is handled as a same program. On a Friday, each of "Owarai gassen" broadcasted on the Saturdays of the last and previous weeks is called a past broadcasted program of the program "Owarai gassen". Each of "Owarai gassen" which are planned to be broadcasted on the tomorrow and later Saturdays is called a future broadcast planned program of the program "Owarai gassen".

The auxiliary program information is generated by the television stations. There is program ranking information generated by each television receiver. Specifically, an automatic program selector in the television receiver generates the program ranking information from the received auxiliary program information. The program ranking information represents keywords extracted from the received auxiliary program information. The program ranking information also represents the frequencies of the viewing of broadcast programs. The program ranking information further represents the degrees of the suitability of user's preference (user's taste) for the broadcast programs in connection with respective items including ones represented by the received auxiliary program information and also a keyword item explained later.

The embodiment of this invention defines an attribute value broadcast item (or items) and an attribute value receiver item (or items). Each of these items is composed of members having respective attribute values.

As previously mentioned, the items represented by the auxiliary program information for each broadcast program are, for example, the title, the on-air time, the on-air channel, the genre, the outline (the brief explanation), and the performer list of the broadcast program. The attribute value broadcast items are ones among the items represented by the auxiliary program information which have predetermined attribute value formats. Examples of the attribute value broadcast items are the genre and the performer list of the broadcast program. Attribute values for the genre item are designed as follows. Different predetermined attribute values are assigned to broadcast programs in different genres respectively. For example, a predetermined attribute value of "1" is assigned to a drama program (one of the members of the genre item), and a predetermined attribute value of "2" is assigned to a sports program (another of the members of the genre item).

Given ones among the items represented by the auxiliary program information for each broadcast program are expressed by text data, and relate to variable attribute values rather than predetermined attribute values. Examples of the text data items are the title and the outline (the brief explanation) of the broadcast program. Each television receiver extracts ones from attribute values for the text data item or items in accordance with prescribed rules to make a new item referred to as the attribute value receiver item. An example of the attribute value receiver item is a keyword item designed as follows. Keywords are extracted as members of the keyword item from the text data by use of a morphological analysis, and variable attribute values are assigned to the extracted keywords respectively. Thus, the extracted keywords are handled as the variable attribute values respectively.

FIG. 1 shows an automatic program selecting apparatus including a program ranking apparatus according to the embodiment of this invention. The automatic program selecting apparatus in FIG. 1 has the functions of receiving broadcasted television signals, displaying images represented by the received television signals, generating sounds represented by the received television signals, recording the received television signals on a recording medium, reproducing the television signals from the recording medium, displaying images represented by the reproduced television signals, and generating sounds represented by the reproduced television signals. The automatic program selecting apparatus further has the function of automatically selecting one or ones from broadcast programs represented by broadcasted television signals.

As shown in FIG. 1, the automatic program selecting apparatus includes a broadcast receiving unit 101 and a viewing controller 102. The broadcast receiving unit 101 has a tuner and a demodulator/separator. When the viewing controller 102 notifies the broadcast receiving unit 101 of a desired channel, the broadcast receiving unit 101 tunes to an RF television signal of the desired channel which is broadcasted from a television station in the form of ground waves or via a broadcast satellite. Thus, the broadcast receiving unit 101 receives the RF television signal of the desired channel. The broadcast receiving unit 101 demodulates the received RF television signal into a baseband television signal, and separates the baseband television signal into an audio-visual signal (a main television signal) and auxiliary program information. The broadcast receiving unit 101 outputs the audio-visual signal to a recording controller 103. The broadcast receiving unit 101 outputs the auxiliary program information to a storage device 104 for program information.

The program-information storage device 104 includes, for example, a combination of a hard disk and a drive for the hard disk. The program-information storage device 104 stores the auxiliary program information outputted from the broadcast receiving unit 101. The program-information storage device 104 stores program ranking information fed from an automatic program selector 105. The automatic program selector 105 can read the auxiliary program information from the program-information storage device 104. The automatic program selector 105 can read and write the program ranking information from and into the program-information storage device 104. The auxiliary program information and the program ranking information in the program-information storage device 104 are updated from time to time. The auxiliary program information in the program-information storage device 104 mentions broadcast programs including past ones, current ones, and future ones.

The recording controller 103 passes the audio-visual signal from the broadcast receiving unit 101 to an output controller 106. When the viewing controller 102 feeds the recording controller 103 with an instruction to implement recording, the recording controller 103 passes the audio-visual signal also to a storage device 107 for audio-visual signals.

The audio-visual-signal storage device 107 includes, for example, a combination of a hard disk and a drive for the hard disk. The audio-visual-signal storage device 107 stores the audio-visual signal fed from the recording controller 103. The output controller 106 can read out an audio-visual signal from the audio-visual-signal storage device 107.

When the viewing controller 102 feeds the output controller 106 with an instruction to view a broadcast program, the output controller 106 passes the audio-visual signal from the recording controller 103 to an output device 108. On the other hand, when the viewing controller 102 feeds the output controller 106 with an instruction to play back a designated program, the output controller 106 reads out an audio-visual signal of the designated program from the audio-visual-signal storage device 107. The output controller 106 feeds the read-out audio-visual signal to the output device 108.

The output device 108 includes an image generator and a sound generator. The image generator is, for example, a CRT or a liquid crystal display. The sound generator is, for example, a loudspeaker. The output device 108 indicates images represented by the audio-visual signal fed from the output controller 106. At the same time, the output device 108 generates sounds represented by the audio-visual signal. The output device 108 can indicate an operation picture for a recording reservation or reservations, a list of recorded programs represented by audio-visual signals stored in the audio-visual-signal storage device 107, and a list of recommended broadcast programs. The recommended broadcast programs may include recording-reserved programs. The output device 108 is informed of the recommended broadcast program list by the automatic program selector 105.

An input device 109 is connected with the viewing controller 102 and the automatic program selector 105. The input device 109 includes a combination of a remote control transmitter and a remote control receiver. A user can input various instructions by operating the input device 109. The various instructions include an instruction to select a channel to be viewed (an instruction to designate a desired channel), an instruction to start the recording of a currently-viewed broadcast program, an instruction to stop the recording thereof, an instruction to make a recording reservation, an instruction to play back a recorded program, an instruction to stop the playback thereof, an instruction to automatically select a broadcast program or programs, and an instruction to select one or ones from a list of recommended broadcast programs as a recording-reserved program or programs.

When an instruction to designate a desired channel is sent to the viewing controller 102 from the input device 109, the viewing controller 102 orders the broadcast receiving unit 101 to receive an RF television signal of the desired channel. When an instruction to start the recording of a currently-viewed broadcast program is sent to the viewing controller 102 from the input device 109, the viewing controller 102 orders the recording controller 103 to start the recording of a corresponding audio-visual signal on the audio-visual-signal storage device 107. When an instruction to stop the recording of a currently-viewed broadcast program is sent to the viewing controller 102 from the input device 109, the viewing controller 102 orders the recording controller 103 to halt the recording of a corresponding audio-visual signal on the audio-visual-signal storage device 107.

An instruction to make a recording reservation or reservations which is inputted via the input device 109 contains recording management information representing the appointed time of starting the reserved recording, the appointed time of stopping the reserved recording, and a channel corresponding to the recording-reserved program for each recording reservation. When an instruction to make a recording reservation is sent to the viewing controller 102 from the input device 109, the viewing controller 102 extracts recording management information from the received instruction and outputs the extracted recording management information to a storage device 110 for recording management information.

When an instruction to play back a recorded program is sent to the viewing controller 102 from the input device 109, the viewing controller 102 orders the output controller 106 to reproduce an audio-visual signal of the designated program from the audio-visual-signal storage device 107. When an instruction to stop the playback of a recorded program is sent to the viewing controller 102 from the input device 109, the viewing controller 102 orders the output controller 106 to halt the reproduction of an audio-visual signal of the designated program from the audio-visual-signal storage device 107.

The viewing controller 102 passes all instructions from the input device 109 to a storage device 111 for a viewing history. The viewing controller 102 checks the recording management information in the recording-management-information storage device 110 at regular intervals to decide whether or not the present moment reaches the appointed time of starting the reserved recording and whether or not the present moment reaches the appointed time of stopping the reserved recording for each recording reservation. When the present moment reaches the appointed time of starting the reserved recording, the viewing controller 102 orders the broadcast receiving unit 101 to receive an RF television signal of the channel corresponding to the recording-reserved program and represented by the recording management information. At the same time, the viewing controller 102 orders the recording controller 103 to start the recording of an audio-visual signal of the recording-reserved program on the audio-visual-signal storage device 107. When the present moment reaches the appointed time of stopping the reserved recording, the viewing controller 102 orders the recording controller 103 to halt the recording of the audio-visual signal of the recording-reserved program.

The recording-management-information storage device 110 includes, for example, a combination of a hard disk and a drive for the hard disk. The recording-management-information storage device 110 stores the recording management information fed from the viewing controller 102. In addition, the recording-management-information storage device 110 stores recording management information fed from the automatic program selector 105. The viewing controller 102 can read out the recording management information from the recording-management-information storage device 110.

The viewing-history storage device 111 includes, for example, a combination of a hard disk and a drive for the hard disk. The viewing-history storage device 111 stores the instructions fed from the viewing controller 102. Furthermore, the viewing controller 102 writes, into the viewing-history storage device 111, information of the date and time at which each of the instructions is stored thereinto. The instructions in the viewing-history storage device 111 and the date and time of storing each of the instructions constitute a viewing history which is updated from time to time. The viewing history means the history of the selection of channels by the user, that is, the history of the viewing of channels by the user. The automatic program selector 105 can read out the viewing history from the viewing-history storage device 111. The viewing-history storage device 111 may automatically erase an older portion of the stored viewing history which remains for a predetermined term or longer.

The automatic program selector 105 can read out the auxiliary program information from the program-information storage device 104. The automatic program selector 105 can read and write the program ranking information from and into the program-information storage device 104. The automatic program selector 105 can read out the viewing history from the viewing-history storage device 111. The automatic program selector 105 can read and write preference information and program-ranking measure information from and into a storage device 112 for preference information.

The automatic program selector 105 searches the read-out auxiliary program information in response to the read-out viewing history for past broadcast programs viewed by the user. In addition, the automatic program selector 105 searches the read-out auxiliary program information for non-viewed past broadcast programs overlapping the viewed ones in on-air time range.

When an instruction to automatically select broadcast programs is sent to the automatic program selector 105 from the input device 109, the automatic program selector 105 generates a signal representing a list of recommended broadcast programs (broadcast programs to be automatically selected). The automatic program selector 105 feeds the program list signal to the output device 108.

An instruction to automatically select broadcast programs may be designed so that automatic program selections will start at respective appointed time points. In this case, the automatic program selector 105 generates recording management information representing a list of recording-reserved programs, and outputs the generated recording management information to the recording-management-information storage device 110. The recording management information also represents the appointed time of starting the reserved recording, the appointed time of stopping the reserved recording, and a channel corresponding to the recording-reserved program for each recording reservation. The recording-management-information storage device 110 stores the recording management information outputted from the automatic program selector 105. The viewing controller 102 responds to the recording management information in the recording-management-information storage device 110, and thereby allows the automatic program selections to start at the respective appointed time points and end at the respective appointed time points.

The preference-information storage device 112 includes, for example, a combination of a hard disk and a drive for the hard disk. The automatic program selector 105 can read and write preference information and program-ranking measure information from and into the preference-information storage device 112. The preference information and the program-ranking measure information in the preference-information storage device 112 are updated from time to time.

It should be noted that a common storage device having a combination of a hard disk and a drive for the hard disk may be shared by the program-information storage device 104, the audio-visual-signal storage device 107, the recording-management-information storage device 110, the viewing-history storage device 111, and the preference-information storage device 112.

The automatic program selector 105 will be described in more detail below. Preferably, the automatic program selector 105 is formed by a microcomputer or a similar programmable device.

Figure 2:
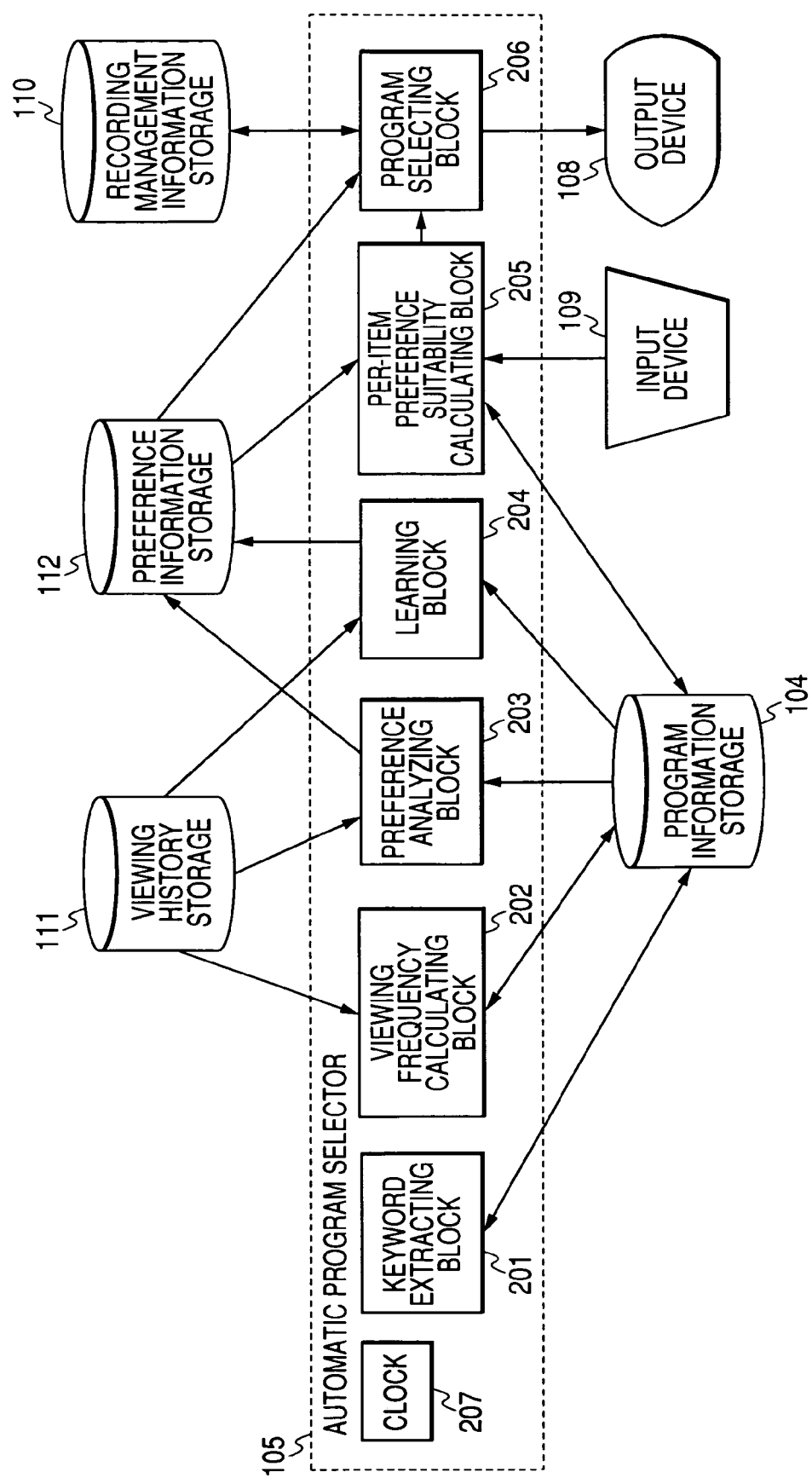
FIG. 2 is a diagram of the software-based structure of an automatic program selector in FIG. 1.

FIG. 2 shows the software-based structure of the automatic program selector 105 rather than the hardware-based structure thereof. As shown in FIG. 2, the automatic program selector 105 includes a keyword extracting block 201, a viewing frequency calculating block 202, a preference analyzing block 203, a learning block 204 for program ranking measures (program ranking criterions or program ranking references), a per-item preference suitability calculating block 205, and a program selecting block 206.

When new auxiliary program information is stored into the program-information storage device 104, that is, when new auxiliary program information is added to old auxiliary program information in the program-information storage device 104 to implement updating, the keyword extracting block 201 reads out the new auxiliary program information from the program-information storage device 104. The keyword extracting block 201 subjects the letters and characters represented by text data in the read-out auxiliary program information to a morphological analysis to extract keywords. The letters and characters express items concerning a related broadcast program or each of related broadcast programs, for example, the title and the outline (the brief explanation) of the related broadcast program or each of the related broadcast programs. The keyword extracting block 201 writes a signal representative of the extracted keywords into the program-information storage device 104 as new program ranking information. The new program ranking information is added to old program ranking information in the program-information storage device 104 to implement updating.

When new auxiliary program information is stored into the program-information storage device 104, that is, when new auxiliary program information is added to old auxiliary program information in the program-information storage device 104 to implement updating, the viewing frequency calculating block 202 reads out the viewing history from the viewing-history storage device 111. Then, the viewing frequency calculating block 202 searches the updated auxiliary program information in the program-information storage device 104 for broadcast programs corresponding to the read-out program history. Subsequently, the viewing frequency calculating block 202 calculates the frequencies of the viewing of the broadcast programs by using the read-out history information. The viewing frequency calculating block 202 writes a signal representative of the calculated viewing frequencies into the program-information storage device 104 as program ranking information. Generally, the writing of the signal representative of the calculated viewing frequencies implements the updating of the program ranking information in the program-information storage device 104. The calculated viewing frequencies obtained by the viewing frequency calculating block 202 include actual ones of past broadcast programs and estimated ones of future broadcast programs.

The preference analyzing block 203 monitors a clock 207 to decide whether or not the present moment reaches a preset time of, for example, day. When the present moment reaches the preset time, the preference analyzing block 203 reads out the viewing history from the viewing-history storage device 111. In addition, the preference analyzing block 203 reads out portions of the auxiliary program information and the program ranking information from the program-information storage device 104 which relate to broadcast programs being viewed objects. Then, the preference analyzing block 203 calculates the degrees of user's preference for the broadcast programs in connection with the respective attribute values in the items on the basis of the read-out viewing history and the read-out portions of the auxiliary program information and the program ranking information. The items include, for example, the genre item, the performer list item, and the keyword item. The preference analyzing block 203 writes information representative of the calculated preference degrees into the preference-information storage device 112 as preference information. Generally, the newly-written preference information replaces the old preference information so that the preference information in the preference-information storage device 112 will be updated.

The program-ranking-reference learning block 204 monitors the clock 207 to decide whether or not the present moment reaches a predetermined time of, for example, day. When the present moment reaches the predetermined time, the program-ranking-reference learning block 204 reads out the viewing history from the viewing-history storage device 111. In addition, the program-ranking-reference learning block 204 reads out the frequencies of the viewing of broadcast programs being viewed objects from the program-information storage device 104. Furthermore, the program-ranking-reference learning block 204 reads out, from the program-information storage device 104, the degrees of the suitability of user's preference for the broadcast programs in connection with the respective items. Then, the program-ranking-reference learning block 204 learns measures (criterions or references) for the ranking of the broadcast programs by use of the read-out viewing history, the read-out frequencies of the viewing of the broadcast programs, and the read-out degrees of the suitability of user's preference for the broadcast programs. Subsequently, the program-ranking-reference learning block 204 writes information representative of the learned measures into the preference-information storage device 112 as program-ranking measure information. Generally, the newly-written program-ranking measure information replaces the old program-ranking measure information so that the program-reference ranking information in the preference-information storage device 112 will be updated.

The per-item preference suitability calculating block 205 monitors the clock 207 to decide whether or not the present moment reaches a prescribed time. When the present moment reaches the prescribed time, the per-item preference suitability calculating block 205 starts an automatic program selection procedure. The per-item preference suitability calculating block 205 starts the automatic program selection procedure also in response to an instruction from the input device 109. Upon the start of the automatic program selection procedure, the per-item preference suitability calculating block 205 reads out the auxiliary program information and the program ranking information from the program-information storage device 104 which relate to television programs (broadcast programs) scheduled to be broadcasted in future. In addition, the per-item preference suitability calculating block 205 reads out, from the preference-information storage device 112, the degrees of user's preference for the broadcast programs in connection with the respective attribute values in the items. Then, the per-item preference suitability calculating block 205 calculates the per-item degrees of the suitability of user's preference for all the future broadcast programs subjected to automatic program selection from the read-out auxiliary program information, the read-out program ranking information, and the read-out degrees of user's preference for the broadcast programs. Subsequently, the per-item preference suitability calculating block 205 writes information representative of the calculated per-item degrees of the suitability of user's preference into the program-information storage device 104 as program ranking information. Generally, the newly-written program-ranking information replaces the old program-ranking information so that the program ranking information in the program-information storage device 104 will be updated. The per-item preference suitability calculating block 205 feeds the calculated per-item degrees of the suitability of user's preference, the read-out auxiliary program information, and the read-out program ranking information to the program selecting block 206.

Upon the reception of the per-item degrees of the suitability of user's preference, the auxiliary program information, and the program ranking information from the per-item preference suitability calculating block 205, the program selecting block 206 reads out the program ranking measures from the preference-information storage device 112. Then, the program selecting block 206 selects ones from the future broadcast programs in response to the per-item degrees of the suitability of user's preference and the program ranking information while using the read-out program ranking measures. Subsequently, the program selecting block 206 selects portions of the auxiliary program information which correspond to the selected broadcast programs. The program selecting block 206 forms the selected portions of the auxiliary program information into a list of the selected broadcast programs before feeding the selected program list to the output device 108 or the recording-management-information storage device 110.

Preferably, the automatic program selector 105 includes a microcomputer or a similar programmable device having a combination of an input/output port, a processing section, a ROM, and a RAM. In this case, the automatic program selector 105 operates in accordance with a computer program stored in the ROM.

Figure 3:
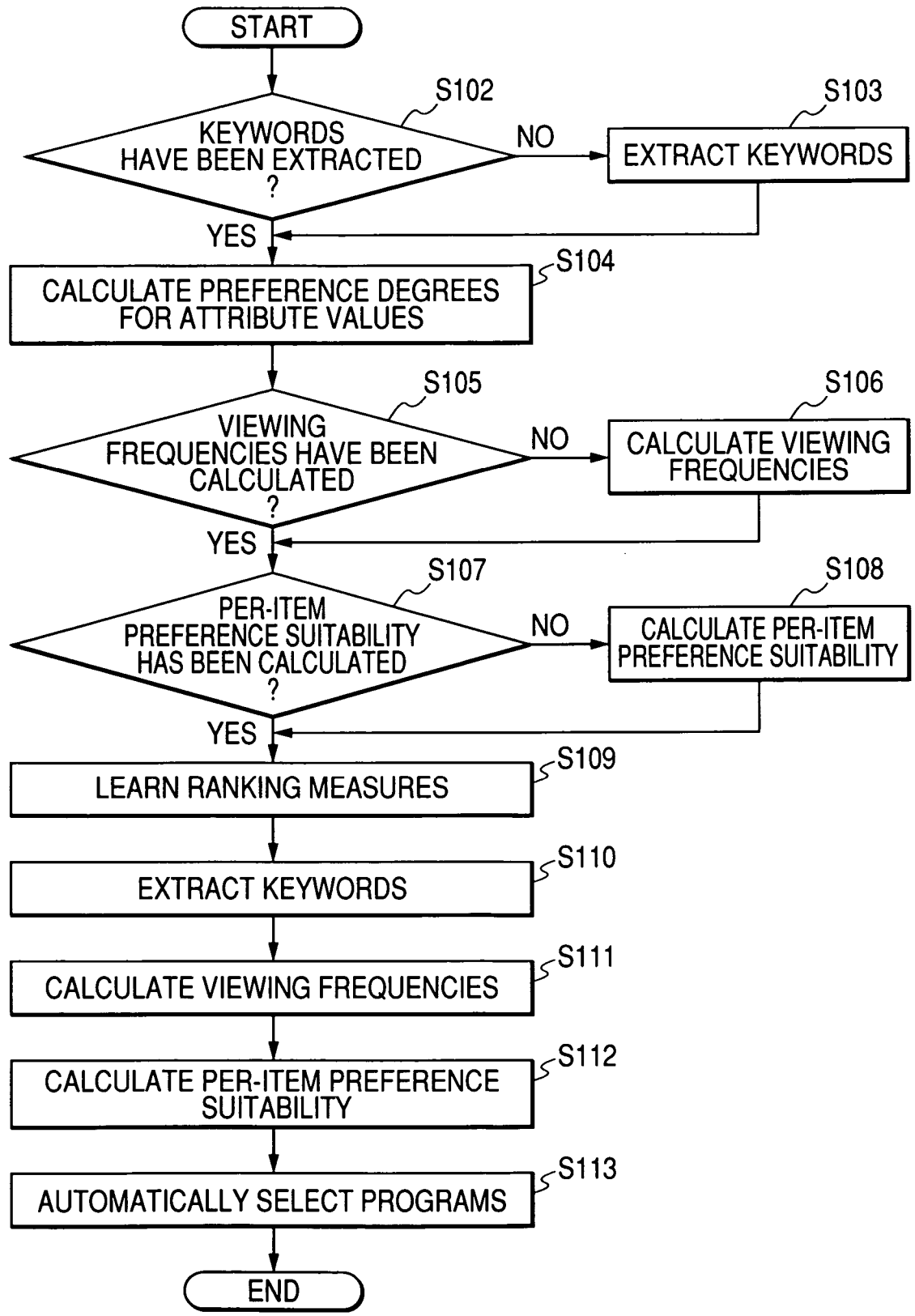
FIG. 3 is a flowchart of a computer program for the automatic program selector in FIGS. 1 and 2.

FIG. 3 is a flowchart of the computer program for the automatic program selector 105. The computer program in FIG. 3 starts each time the automatic program selection procedure is commenced.

As shown in FIG. 3, a first step S102 of the computer program decides whether or not keywords have been extracted in connection with broadcast programs mentioned in the auxiliary program information in the program-information storage device 104. The broadcast programs mentioned in the auxiliary program information stored in the program-information storage device 104 include first ones corresponding to the viewing history in the viewing-history storage device 111 and actually viewed by the user, and second ones broadcasted simultaneously with the first ones on other channels. The first broadcast programs are called the viewed broadcast programs while the second broadcast programs are called the non-viewed broadcast programs. Normally, keywords for broadcast programs relating to the viewing history have been extracted as a result of the previous execution of the automatic program selection procedure. On the other hand, such keywords have not been extracted yet in the case where the automatic program selection procedure is executed for the first time or in the case where the automatic program selection procedure has failed to be executed on the past days due to a certain cause such as a power supply being at an off state. When the step S102 decides that keywords have not been extracted yet, the computer program advances from the step S102 to a step S103. Otherwise, the computer program advances from the step S102 to a step S104.

The step S103 extracts keywords as the keyword extracting block 201 in FIG. 2 does. Thus, the step S103 corresponds to the keyword extracting block 201. After the step S103, the computer program advances to the step S104.

The step S104 calculates the degrees of user's preference for the broadcast programs in connection with the respective attribute values in the items as the preference analyzing block 203 in FIG. 2 does. Thus, the step S104 corresponds to the preference analyzing block 203. After the step S104, the computer program advances to a step S105.

The step S105 decides whether or not the frequencies of the viewing of the broadcast programs relating to the viewing history have been calculated. When the viewing frequencies have not been calculated yet, the computer program advances from the step S105 to a step S106. Otherwise, the computer program advances from the step S105 to a step S107.

The step S106 calculates the frequencies of the viewing of the broadcast programs relating to the viewing history as the viewing frequency calculating block 202 in FIG. 2 does. Thus, the step S106 corresponds to the viewing frequency calculating block 202. After the step S106, the computer program advances to the step S107.

The step S107 decides whether or not the per-item degrees of the suitability of user's preference for the broadcast programs relating to the viewing history have been calculated. When the per-item degrees of the suitability of user's preference have not been calculated yet, the computer program advances from the step S107 to a step S108. Otherwise, the computer program advances from the step S107 to a step S109.

The step S108 calculates the per-item degrees of the suitability of user's preference for the broadcast programs relating to the viewing history as the per-item preference suitability calculating block 205 in FIG. 2 does. Thus, the step S108 corresponds to the per-item preference suitability calculating block 205. After the step S108, the computer program advances to the step S109.

The step S109 learns measures for the ranking of the broadcast programs as the program-ranking-reference learning block 204 in FIG. 2 does. Thus, the step S109 corresponds to the program-ranking-reference learning block 204. After the step S109, the computer program advances to a step S110.

The above steps S102-S109 concerns the viewing history and the past broadcast programs including the past sections (the past episodes) of weekly broadcast programs. The past broadcast programs may also include ones of types different from the weekly type. On the other hand, the step S110 and later steps basically concern future broadcast programs which mean ones scheduled to be broadcasted in future. The future broadcast programs include future portions (future episodes) of the weekly broadcast programs. The future broadcast programs may also include (1) ones of types different from the weekly type and (2) new ones.

The step S110 extracts keywords from portions of the auxiliary program information in the program-information storage device 104 which correspond to all the future broadcast programs. Preferably, the extraction of the keywords by the step S110 is in a way similar to that of the extraction of the keywords by the sep S103.

A step S111 following the step S110 calculates the estimated frequencies of the viewing of all the future broadcast programs from (1) the portions of the viewing history in the viewing-history storage device 104 which relate to the past broadcast programs corresponding to the future broadcast programs, and (2) the auxiliary program information in the program-information storage device 104. Preferably, the calculation of the estimated viewing frequencies by the step S111 is in a way similar to that of the calculation of the viewing frequencies by the step S106.

A step S112 subsequent to the step S111 calculates the per-item degrees of the suitability of user's preference for all the future broadcast programs from the program ranking information and the auxiliary program information in the program-information storage device 104 which relate to the future broadcast programs. Preferably, the calculation of the per-item suitability degrees by the step S112 is in a way similar to that of the calculation of the per-item suitability degrees by the step S108.

A step S113 following the step S112 automatically selects ones from all the future broadcast programs represented by the auxiliary program information in the program-information storage device 104 in response to (1) the ranking measures learned by the step S109, (2) the estimated viewing frequencies calculated by the step S111, and (3) the per-item suitability degrees calculated by the step S112. After the step S113, the current execution cycle of the computer program ends.

The keyword extracting block 201 and the steps S103 and S110 of extracting the keywords will be described in more detail below. The keyword extracting block 201 implements the keyword extracting steps S103 and S110.

Figure 4:
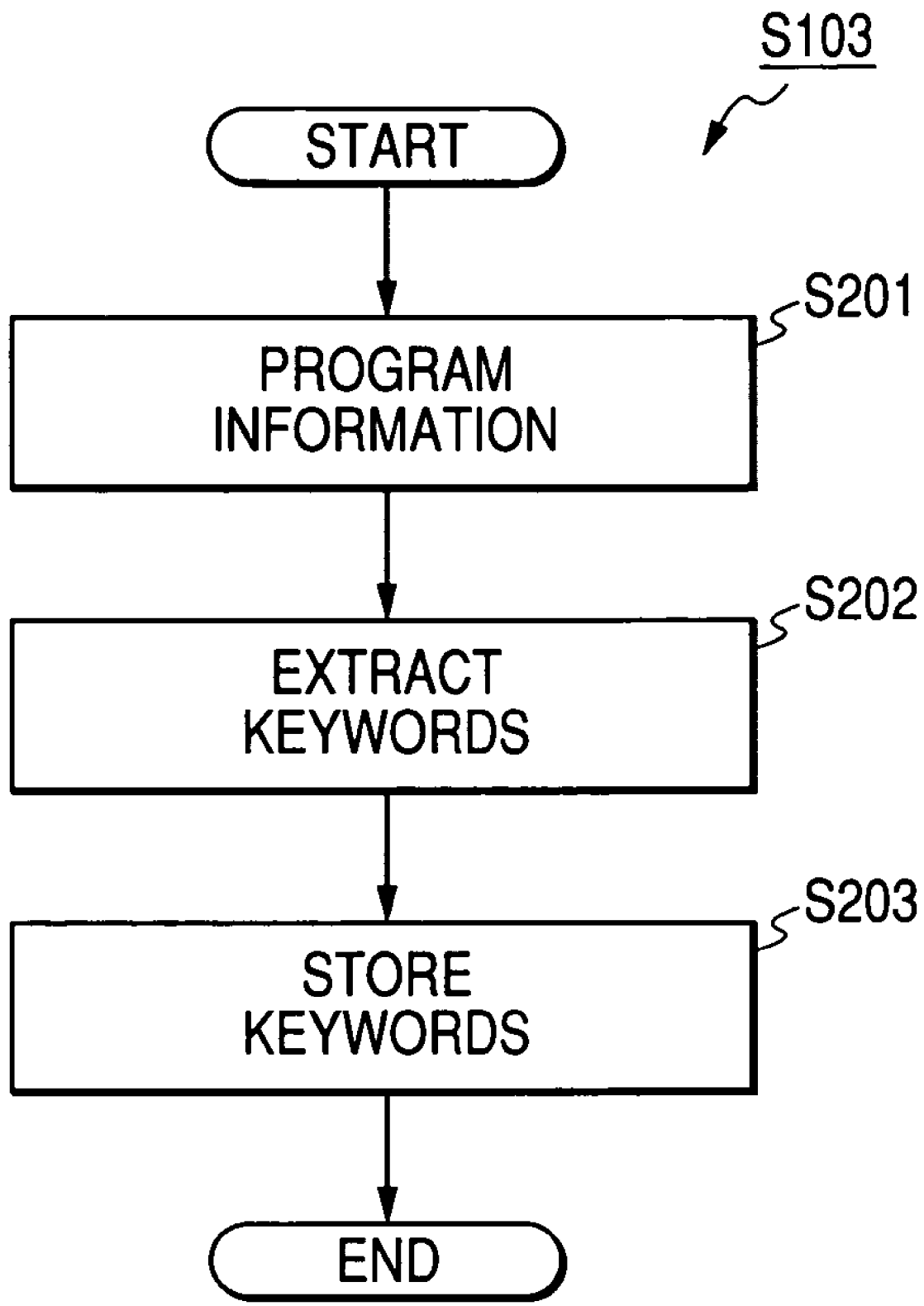
FIG. 4 is a flowchart of the details of a first step in FIG. 3.

As shown in FIG. 4, the keyword extracting step S103 has a sequence of sub-steps. With reference to FIG. 4, a first sub-step S201 in the keyword extracting step S103 follows the step S102 in FIG. 3. The sub-step S201 reads out the auxiliary program information from the program-information storage device 104.

A sub-step S202 subsequent to the sub-step S201 accesses the text data in the read-out auxiliary program information which represents the title and the outline (the brief explanation) of each of the broadcast programs. The sub-step S202 subjects the letters and characters represented by the accessed text data to the morphological analysis to extract keywords.

A sub-step S203 following the sub-step S202 stores information representative of the extracted keywords into the program-information storage device 104 for later use by the steps S104, S108, and S112 in FIG. 3. The sub-step S203 is succeeded by the step S104.

The keyword extracting step S110 in FIG. 3 has a sequence of sub-steps similar to those in the keyword extracting step S103. Keywords extracted by the keyword extracting step S110 related to future broadcast programs while those extracted by the keyword extracting step S103 relate to past broadcast programs.

The viewing frequency calculating block 202 and the steps S106 and S111 of calculating the frequencies of the viewing of the broadcast programs will be described in more detail below. The viewing frequency calculating block 202 implements the viewing frequency calculating steps S106 and S111.

In general, regarding weekly broadcast programs, the viewing frequencies are calculated. Daily broadcast programs are also counted as weekly broadcast programs. A certain weekly broadcast program "p" is taken as an example. The letter "p" is used for identifying the related weekly broadcast program. A decision is made as to whether or not the weekly broadcast program "p" was viewed by the user at the time "w" weeks before this week on the basis of a portion of the auxiliary program information which corresponds to the weekly broadcast program "p" and a "w"-week previous portion of the viewing history. Specifically, it is decided that the weekly broadcast program "p" was viewed by the user at the time "w" weeks before this week in the case where the following conditions (1) and (2) are satisfied. (1) A part of the viewing history indicates the occurrence of the viewing of the channel same as that for the "w"-week previous section (episode) of the weekly broadcast program "p" in a given time range covering that of the "w"-week previous section of the weekly broadcast program "p". (2) The title of a broadcast program which is derived from the auxiliary program information and which corresponds to the part of the viewing history is the same as that of the weekly broadcast program "p". A discriminant f(p,w) is defined as follows. The discriminant f(p,w) is set to 1 in the case where the weekly broadcast program "p" was viewed by the user at the time "w" weeks before this week. Otherwise, the discriminant f(p,w) is set to 0.

Then, the frequency Pf(p) of the viewing of the weekly broadcast program "p" is calculated according to the following equation.

$$Pf(p) = \frac{\sum_{w=1}^{Nw} \left\{\cos\frac{\pi}{Nw}\left(w - \frac{1}{2}\right) + 1\right\} f(p, w)}{Nw} \quad (1)$$

where Nw denotes the number of the counted past successive weeks. Preferably, the week number Nw is predetermined. The week number Nw is equal to or greater than 1. For example, the week number Nw is equal to 50. In the above equation (1), the discriminants f(p,1), f(p,2), ..., and f(p,Nw) are multiplied by the cosine-based window functions respectively, and the multiplication results are summed. The viewing frequency Pf(p) is normalized into the range from 0 to 1. The multiplication by the cosine-based window functions enables a later portion of the viewing history to be more dominant in the calculation of the viewing frequency Pf(p).

Figure 5:
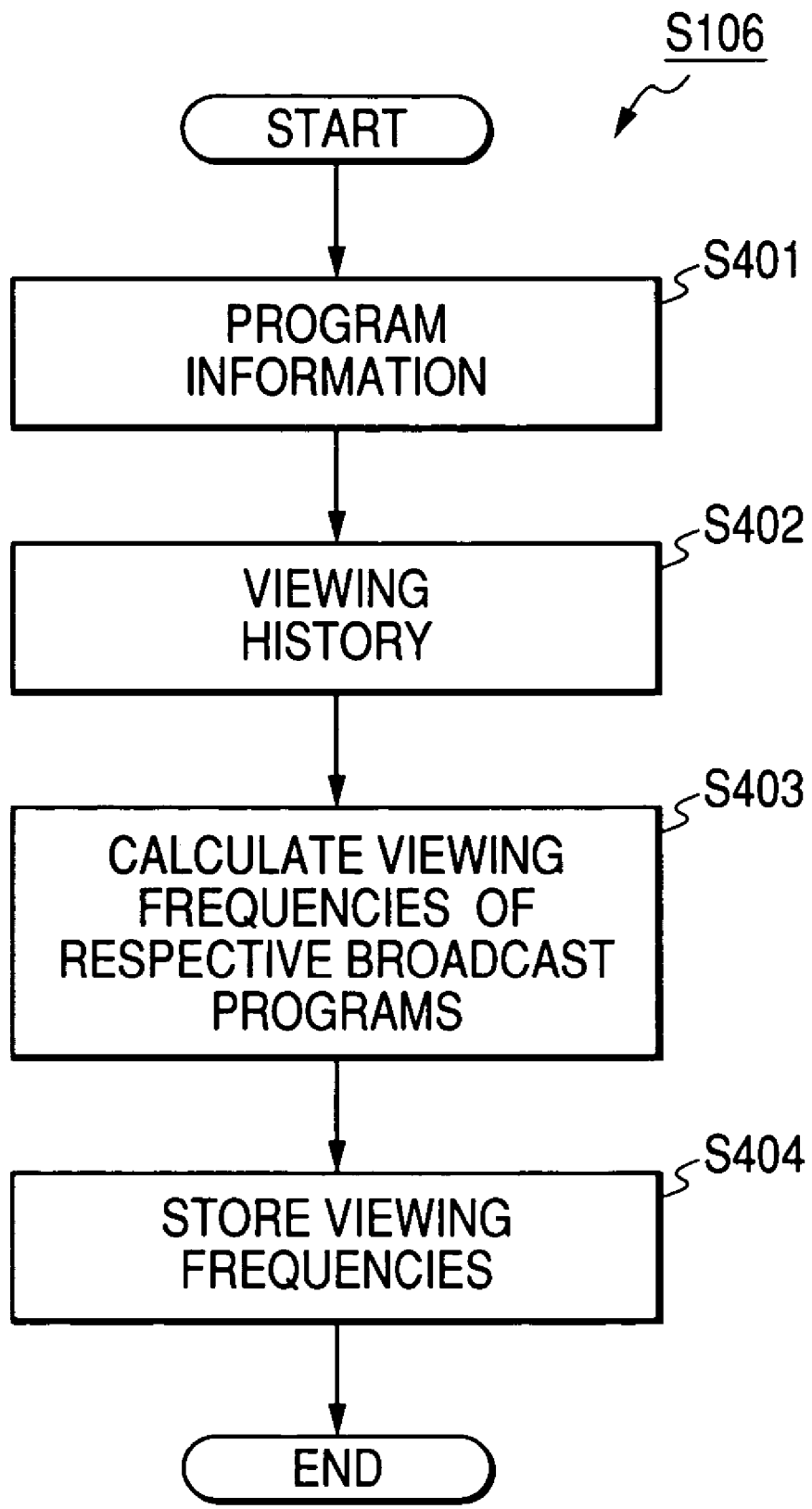
FIG. 5 is a flowchart of the details of a second step in FIG. 3.

As shown in FIG. 5, the viewing frequency calculating step S106 has a sequence of sub-steps. With reference to FIG. 5, a first sub-step S401 in the viewing frequency calculating step S106 follows the step S105 in FIG. 3. The sub-step S401 reads out the auxiliary program information from the program-information storage device 104.

A sub-step S402 subsequent to the sub-step S401 reads out the viewing history from the viewing-history storage device 111.

A sub-step S403 following the sub-step S402 decides the discriminants f(p,w) for each weekly broadcast program "p" on the basis of the read-out viewing history and the read-out auxiliary program information. Then, the sub-step S403 calculates the frequency Pf(p) of the viewing of the weekly broadcast program "p" for the counted past weeks from the decided discriminants f(p,w) according to the previously-indicated equation (1).

A sub-step S404 subsequent to the sub-step S403 stores information representative of the calculated viewing frequencies of the respective weekly broadcast programs into the program-information storage device 104. The sub-step S404 is succeeded by the step S107 in FIG. 3.

The viewing frequency calculating step S111 in FIG. 3 has a sequence of sub-steps similar to those in the viewing frequency calculating step S106. The viewing frequency calculating step S111 calculates the estimated viewing frequencies of all future broadcast programs mentioned in the auxiliary program information in the program-information storage device 104. For example, regarding future broadcast programs which are future sections (future episodes) of weekly broadcast programs, the viewing frequency calculating step S111 sets the estimated viewing frequencies to the calculated viewing frequencies of the weekly broadcast programs for their past sections (their past episodes).

The preference analyzing block 203 and the step S104 of calculating the degrees of user's preference for the broadcast programs in connection with the respective attribute values in the items will be described in more detail below.

Consideration is given to how much the user concentrates on watching a broadcast program. In some cases, the user views a broadcast program while doing another thing. In these cases, the degree to which the user concentrates on watching the broadcast program is relatively low. Portions for which the degree of concentration about watching broadcast programs seems relatively low are removed from the viewing history. Thus, the viewing history is modified. Generally, a weekly broadcast program always viewed by the user with a low degree of concentration tends to score a high viewing frequency. On the other hand, when the user watches a weekly broadcast program having a low viewing frequency, the degree of concentration about watching the program at this time is thought to be relatively high. Accordingly, weekly broadcast programs corresponding to the viewing history and having viewing frequencies greater than a prescribed threshold value are excluded from the analysis of user's preference. Thus, weekly broadcast programs viewed by the user with low degrees of concentration are excluded from the analysis of user's preference. The prescribed threshold value is in the range of 0 to 1. For example, the prescribed threshold value is equal to about 0.5.

Then, the analysis of user's preference is implemented by use of the modified viewing history. The analysis of user's preference uses weekly broadcast programs corresponding to the modified viewing history. As previously mentioned, there are the items each composed of members having respective attribute values. The items are classified into the attribute value broadcast items and the attribute value receiver item. The attribute value broadcast items include the genre item and the performer list item while the attribute value receiver item is the keyword item. The attribute value broadcast items are contained in the auxiliary program information while the attribute value receiver item is included in the program ranking information. The number f(x) of times of the appearance of each attribute value (each member) "x" in each of the items is calculated regarding the weekly broadcast programs corresponding to the modified viewing history. The calculated numbers of appearance times are normalized on an item-by-item basis. Specifically, the calculated number f(x) of appearance times of the attribute value (the member) "x" is normalized into a value P(x) in the range of 0 to 1 according to the following equation.

$$P(x) = \frac{\log\left(\frac{A}{f\max} f(x) + 1\right)}{\log(A + 1)} \quad (2)$$

where fmax denotes the greatest of the numbers of appearance times of all the attribute values (the members) in the item containing the attribute value (the member) "x", and A denotes a predetermined constant. Preferably, the constant A is chosen in consideration of the shape of the curve defined by the logarithmic function used for the normalization. The normalized value P(x) is defined as the degree of user's preference corresponding to the attribute value (the member) "x".

With reference to FIG. 6, the genre item has one of attribute values (members) "news", "sports", and "drama" corresponding to user's preference degrees of, for example, 0.2, 0.48, and 0.16 respectively. The performer list item is composed of attribute values (members) "Hanako Miura", "Taro Yamato", and "Jiro Yokohama" corresponding to user's preference degrees of, for example, 0.73, 0.55, and 0.14 respectively. The keyword item is composed of attribute values (members) "America", "health", and "hot spring" corresponding to user's preference degrees of, for example, 0.36, 0.87, and 0.49 respectively.

Figure 7:
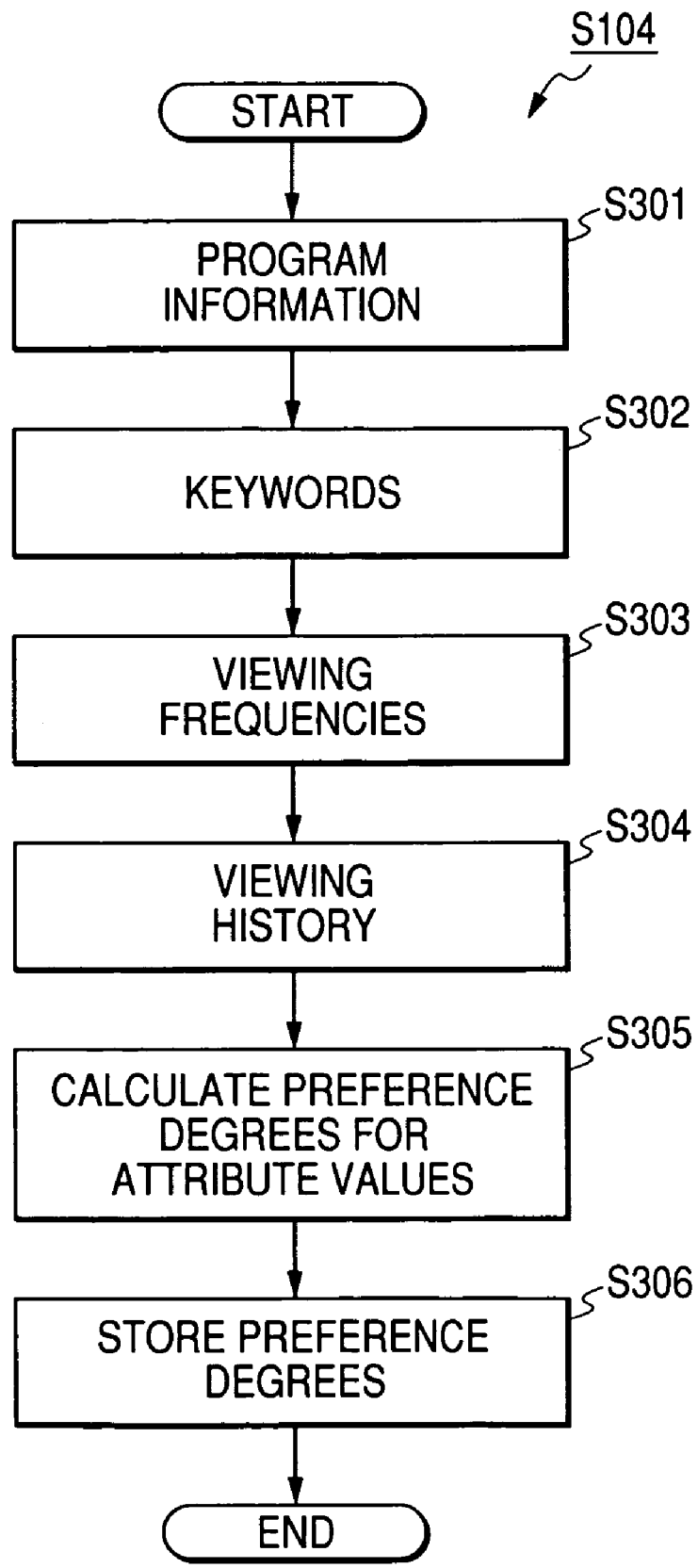
FIG. 7 is a flowchart of the details of a third step in FIG. 3.

As shown in FIG. 7, the preference degree calculating step S104 has a sequence of sub-steps. With reference to FIG. 7, a first sub-step S301 in the preference degree calculating step S104 follows the step S102 or the step S103 in FIG. 3. The sub-step S301 reads out the auxiliary program information from the program-information storage device 104.

A sub-step S302 subsequent to the sub-step S301 reads out the keywords from the program-information storage device 104 as the keyword item (the attribute value receiver item).

A sub-step S303 following the sub-step S302 reads out the viewing frequencies from the program-information storage device 104.

A sub-step S304 subsequent to the sub-step S303 reads out the viewing history from the viewing-history storage device 111.

A sub-step S305 following the sub-step S304 extracts the attribute value broadcast items from the read-out auxiliary program information. The extracted attribute value broadcast items are the genre item and the performer list item. The sub-step S305 uses the keyword item as the extracted attribute value receiver item. The sub-step S305 calculates the number f(x) of times of the appearance of each attribute value (each member) "x" in each of the extracted items. Then, the sub-step S305 calculates the degree P(x) of user's preference corresponding to the attribute value (the member) "x" from the calculated appearance-time number f(x) according to the previously-indicated equation (2).

Preferably, the sub-step S305 compares the read-out viewing frequencies with the prescribed threshold value, and detects ones among the weekly broadcast programs corresponding to the read-out viewing history and mentioned in the read-out auxiliary program information which have viewing frequencies greater than the prescribed threshold value. The sub-step S305 excludes the detected weekly broadcast programs from the read-out auxiliary program information to get modified auxiliary program information. This process means that the read-out viewing history is changed into the modified viewing history. The sub-step S305 uses the modified auxiliary program information for the calculation of the degree P(x) of user's preference corresponding to each attribute value (each member) "x". Accordingly, weekly broadcast programs watched by the user with low degrees of concentration are excluded from the analysis of user's preference.

A sub-step S306 subsequent to the sub-step S305 stores information representative of the calculated preference degrees for the respective attribute values (the respective item members) into the preference-information storage device 112. The sub-step S306 is succeeded by the step S105 in FIG. 3.

The per-item preference suitability calculating block 205 and the steps S108 and S112 of calculating the per-item degrees of the suitability of user's preference for the broadcast programs will be described in more detail below.

The preference degrees for the respective attribute values (the respective members) in the items are read out from the preference-information storage device 112. The per-item degrees of the suitability of user's preference are calculated from the read-out preference degrees for the respective attribute values on an item-by-item basis. As previously mentioned, the items include the genre item, the performer list item, and the keyword item.

Regarding the genre item, each broadcast program is assigned only one attribute value corresponding to only one preference degree. Therefore, the preference degree corresponding to the attribute value assigned to each broadcast program is used as the per-item degree of the suitability of user's preference for the broadcast program.

Regarding the performer list item and the keyword item, each broadcast program can relate to a plurality of attribute values (item members) corresponding to respective preference degrees. Accordingly, the sum of the preference degrees corresponding to the respective attribute values is calculated, and the calculated sum is normalized. Then, the normalized sum is used as the per-item degree of the suitability of user's preference for the broadcast program of interest. Specifically, the attribute values of the members of the performer list item or the keyword item are denoted by x1, x2, ..., and xN respectively. Thus, the preference degrees for the respective attribute values are denoted by P(x1), P(x2), ..., and P(xN) respectively. The sum Psum of the preference degrees P(x1), P(x2), ..., and P(xN) is calculated according to the following equation.

$$Psum = \sum_{n=1}^{N} P(xn) \quad (3)$$

Then, the calculated sum Psum is normalized into a value P in the range of 0 to 1 according to the following equation.

$$P = \frac{\log\left(\frac{B}{N\max}Psum + 1\right)}{\log(B+1)} \quad (4)$$

where Nmax denotes the greatest of the numbers of the attribute values (the members) in the present item "x" for respective broadcast programs including the broadcast program of interest, and B denotes a predetermined constant. The normalized value P is defined as the per-item degree of the suitability of user's preference for the broadcast program of interest. The logarithmic function in the equation (4) is in harmony with human sensitivity. Preferably, the constant B is chosen in consideration of the shape of the curve defined by the logarithmic function used for the normalization. As the constant B is greater, the degree of the upward convex defined by the logarithmic function increases so that the distribution of the normalized per-item degrees of the suitability deforms toward a greater side. On the other hand, as the constant B is smaller, the degree of the upward convex defined by the logarithmic function decreases so that the distribution of the normalized per-item degrees of the suitability becomes flatter.

Figure 8:
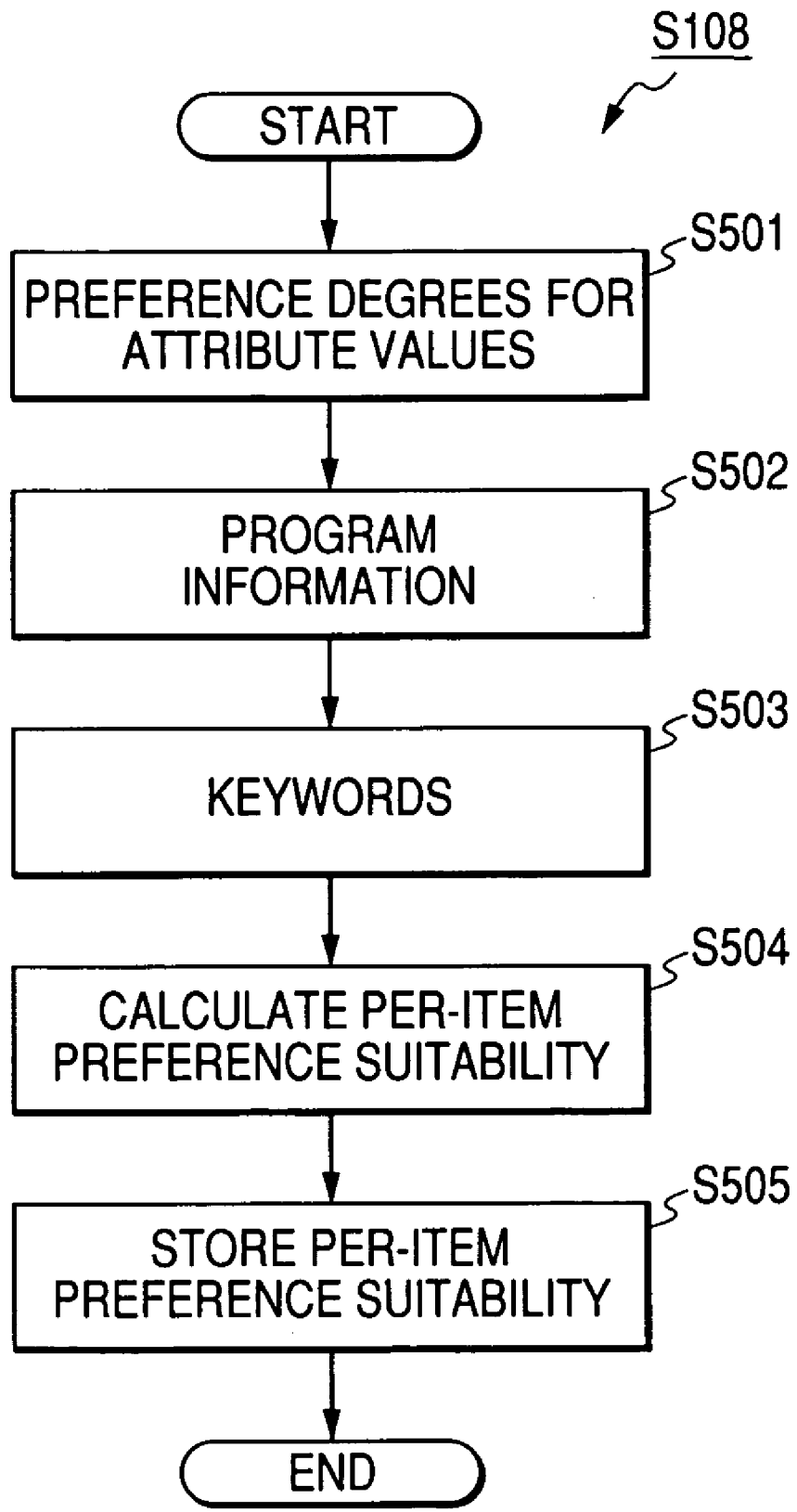
FIG. 8 is a flowchart of the details of a fourth step in FIG. 3.

As shown in FIG. 8, the per-item preference suitability calculating step S108 has a sequence of sub-steps. With reference to FIG. 8, a first sub-step S501 in the per-item suitability degree calculating step S108 follows the step S107 in FIG. 3. The sub-step S501 reads out the degrees of user's preference for the respective attribute values (the respective item members) from the preference-information storage device 112.

A sub-step S502 subsequent to the sub-step S501 reads out the auxiliary program information from the program-information storage device 104.

A sub-step S503 following the sub-step S502 reads out the keywords from the program-information storage device 104 as the keyword item (the attribute value receiver item).

A sub-step S504 subsequent to the sub-step S503 extracts the attribute value broadcast items from the read-out auxiliary program information. The extracted attribute value broadcast items are the genre item and the performer list item. The sub-step S504 uses the keyword item as the extracted attribute value receiver item. Regarding the genre item, the sub-step S504 uses the read-out preference degree corresponding to the attribute value assigned to each broadcast program as the per-item degree of the suitability of user's preference for the broadcast program. Regarding the performer list item and the keyword item, the sub-step S504 calculates the per-item degree of the suitability of user's preference for each broadcast program from the read-out preference degrees according to the previously-indicated equations (3) and (4).

A sub-step S505 following the sub-step S504 stores information representative of the per-item degrees of the suitability of user's preference for the broadcast programs into a memory within the per-item preference suitability calculating block 205. The sub-step S505 is succeeded by the step S109 in FIG. 3.

The per-item preference suitability calculating step S112 in FIG. 3 has a sequence of sub-steps similar to those in the per-item preference suitability calculating step S108. The per-item suitability degrees calculated the per-item preference suitability calculating step S112 relate to future broadcast programs while those calculated by the per-item preference suitability calculating step S108 relate to past broadcast programs.

The program-ranking-reference learning block 204 and the step S109 of learning the measures for the ranking of the broadcast programs will be described in more detail below. The program-ranking-reference learning block 204 implements the program-ranking-reference learning step S109.

The program-ranking-reference learning block 204 or the program-ranking-reference learning step S109 uses an artificial neural network for learning the program ranking measures. The artificial neural network is formed by the microcomputer or the similar programmable device in the automatic program selector 105. The artificial neural network is composed of neurons each designed as follows.

Figure 9:
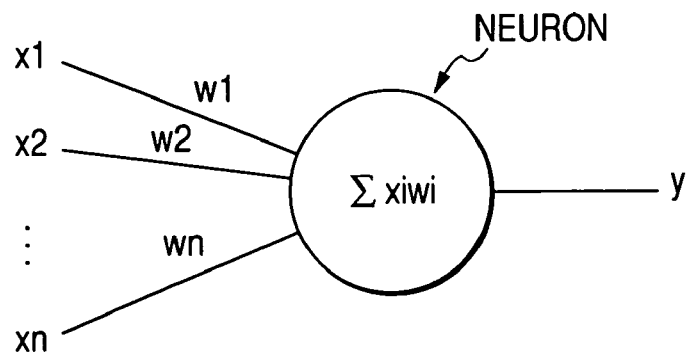
FIG. 9 is a diagram of a neuron.

With reference to FIG. 9, a neuron responds to input values $xi$ ($x1$, $x2$, ..., $xn$) fed thereto. Specifically, the neuron multiplies the input values $xi$ with weights $wi$ ($w1$, $w2$, ..., $wn$) respectively, and sums the multiplication results as $\Sigma xi \cdot wi$. When the multiplication-result sum $\Sigma xi \cdot wi$ exceeds a threshold value, the neuron outputs the sum $\Sigma xi \cdot wi$ as an output value. Otherwise, the neuron outputs "0".

Figure 10:
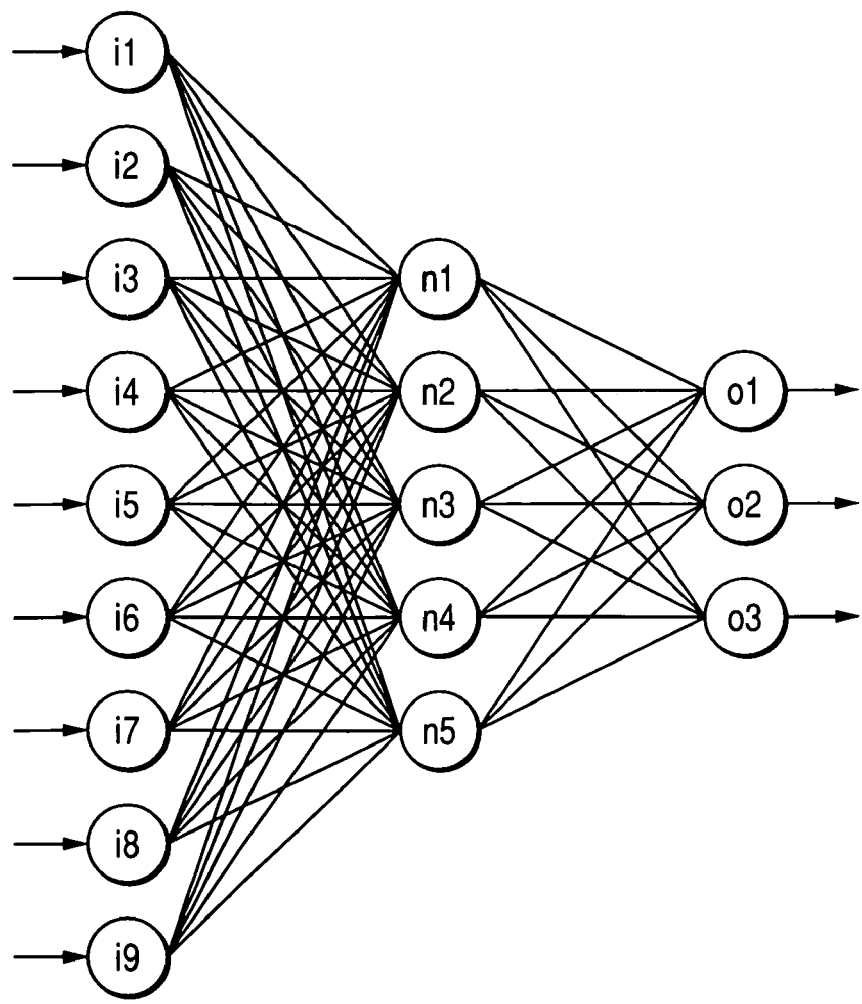
FIG. 10 is a diagram of a typical artificial neural network.

As shown in FIG. 10, a typical artificial neural network has a hierarchical arrangement of neurons. Specifically, the artificial neural network in FIG. 10 has an input layer of neurons $i1$, $i2$, ..., and $i9$, an intermediate layer of neurons $n1$, $n2$, ..., and $n5$, and an output layer of neurons $o1$, $o2$, and $o3$. Each of the neurons in the intermediate layer is connected with all the neurons in the input layer and all the neurons in the output layer. Input values are fed to the neurons in the input layer, respectively. Output values are outputted from the respective neurons in the output layer in response to the input values. The artificial neural network in FIG. 10 is subjected to a training procedure, that is, a supervised learning procedure called "backpropagation". During the execution of the backpropagation, many different sets of training input values and desired output values are successively and cyclically applied to the artificial neural network in FIG. 10 while the weights and the threshold values of the neurons are adjusted. The adjustment of the weights and the threshold values is intended to minimize the errors between the desired output values and the actual output values. As a result, it is possible to determine desired weights and a desired threshold value of each of the neurons which allow the artificial neural network in FIG. 10 to generate correct output values (error-free output values) in response to actual input values.

Figure 11:
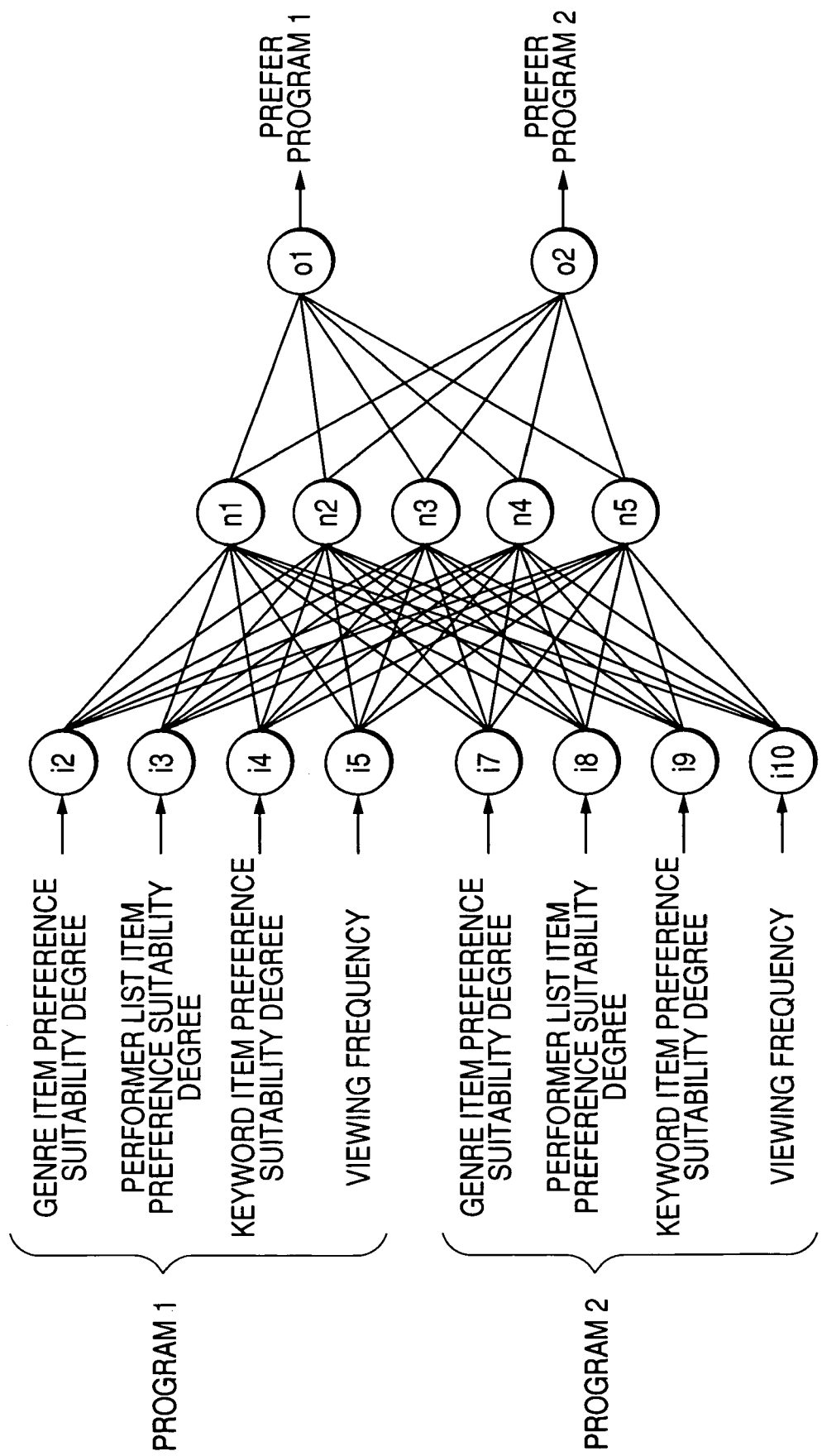
FIG. 11 is a diagram of an artificial neural network for learning program ranking measures in the embodiment of this invention.

FIG. 11 shows the structure of the artificial neural network for learning the program ranking measures which is used by the program-ranking-reference learning block 204 or the program-ranking-reference learning step S109. The artificial neural network in FIG. 11 has an input layer of neurons $i2$, $i3$, ..., and $i10$, an intermediate layer of neurons $n1$, $n2$, ..., and $n5$, and an output layer of neurons $o1$ and $o2$. Each of the neurons in the intermediate layer is connected with all the neurons in the input layer and all the neurons in the output layer. Input values are fed to the neurons in the input layer, respectively. Output values are outputted from the respective neurons in the output layer in response to the input values. The artificial neural network in FIG. 11 is subjected to the backpropagation. During the execution of the backpropagation, many different sets of training input values and desired output values are successively and cyclically applied to the artificial neural network in FIG. 11 while the weights and the threshold values of the neurons are adjusted. The adjustment of the weights and the threshold values is intended to minimize the errors between the desired output values and the actual output values. As a result, it is possible to determine desired weights and a desired threshold value of each of the neurons which allow the artificial neural network in FIG. 11 to generate correct output values (error-free output values) in response to actual input values.

The details of the backpropagation implemented on the artificial neural network in FIG. 11 are as follows. The per-item degrees of the suitability of user's preference for two arbitrary broadcast programs "1" and "2" in connection with the genre item, the performer list item, and the keyword item, and the viewing frequencies of the two arbitrary broadcast programs "1" and "2" are used as training input values fed to the respective neurons in the input layer of the artificial neural network of FIG. 11. When the user prefers the program "1" to the program "2", the desired output values generated by the neurons $o1$ and $o2$ in the output layer are set to 1 and 0 respectively. On the other hand, when the user prefers the program "2" to the program "1", the desired output values generated by the neurons $o1$ and $o2$ are set to 0 and 1 respectively. It should be noted that the number of the neurons in the intermediate layer may be changed from five in consideration of the calculation time and the calculation accuracy.

Generally, the user compares simultaneously-broadcasted television programs to select one therefrom which should be viewed. The learning of the program ranking measures utilizes this behavior of the user. Specifically, sets of the per-item degrees of the suitability of user's preference in connection with the genre item, the performer list item, and the keyword item, and the viewing frequencies are prepared as sets of training input values for all possible pairs of broadcast programs corresponding to the viewing history and other broadcast programs in the same on-air time ranges as those of the former broadcast programs. The other broadcast programs are detected from the auxiliary program information. Corresponding sets of desired output values are chosen to reflect the fact that the user selected the broadcast programs corresponding to the viewing history rather than the other ones.

Figure 12:
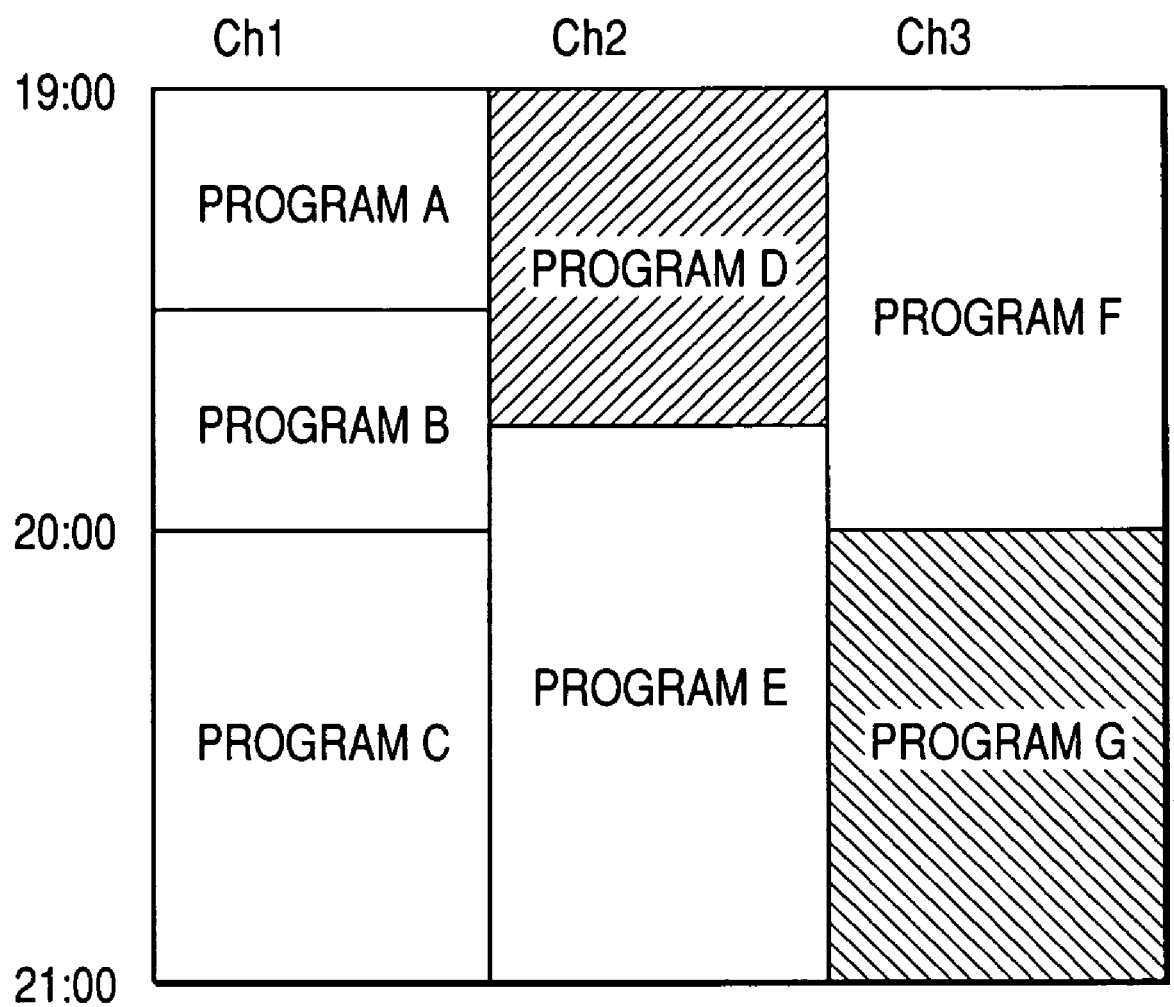
FIG. 12 is a diagram of an example of a TV program schedule.

With reference to FIG. 12, it is assumed that the user viewed a broadcast program D rather than broadcast programs A, B, and F during the time range from 19:00 to 19:45. In this case, six program pairs are prepared as a pair of the arbitrary broadcast programs "1" and "2" in FIG. 11. The six program pairs are (the program D, the program A), (the program D, the program B), (the program D, the program F), (the program A, the program D), (the program B, the program D), and (the program F, the program D). Desired output values generated by the neurons o1 and o2 in the output layer are set to 1 and 0 respectively for the pairs (the program D, the program A), (the program D, the program B), and (the program D, the program F). On the other hand, desired output values are set to 0 and 1 respectively for the pairs (the program A, the program D), (the program B, the program D), and (the program F, the program D). It is assumed that the user viewed a broadcast program G rather than broadcast programs C and E during the time range from 20:00 to 21:00. In this case, four program pairs are prepared as a pair of the arbitrary broadcast programs "1" and "2" in FIG. 11. The four program pairs are (the program G, the program C), (the program G, the program E), (the program C, the program G), and (the program E, the program G). Desired output values generated by the neurons o1 and o2 in the output layer are set to 1 and 0 respectively for the pairs (the program G, the program C) and (the program G, the program E). On the other hand, desired output values are set to 0 and 1 respectively for the pairs (the program C, the program G) and (the program E, the program G). The preparation of program pairs and the setting of desired output values regarding a recording reservation are similar to those regarding the viewing of an on-air broadcast program. It is assumed that the user played back a recorded program H without viewing the broadcast programs C, E, and G during the time range from 20:00 to 21:00. In this case, six program pairs are prepared as a pair of the arbitrary broadcast programs "1" and "2" in FIG. 11. The six program pairs are (the program H, the program C), (the program H, the program E), (the program H, the program G), (the program C, the program H), (the program E, the program H), and (the program G, the program H). Desired output values generated by the neurons o1 and o2 in the output layer are set to 1 and 0 respectively for the pairs (the program H, the program C), (the program H, the program E), and (the program H, the program G). On the other hand, desired output values are set to 0 and 1 respectively for the pairs (the program C, the program H), (the program E, the program H), and (the program G, the program H).

As previously mentioned, sets of the per-item degrees of the suitability of user's preference in connection with the genre item, the performer list item, and the keyword item, and the viewing frequencies are prepared as sets of training input values for all the prepared program pairs. Corresponding sets of desired output values are prepared. The sets of the training input values and the sets of the desired output values are used in the backpropagation to determine desired weights and a desired threshold value of each of the neurons in the artificial neural network of FIG. 11.

Figure 13:
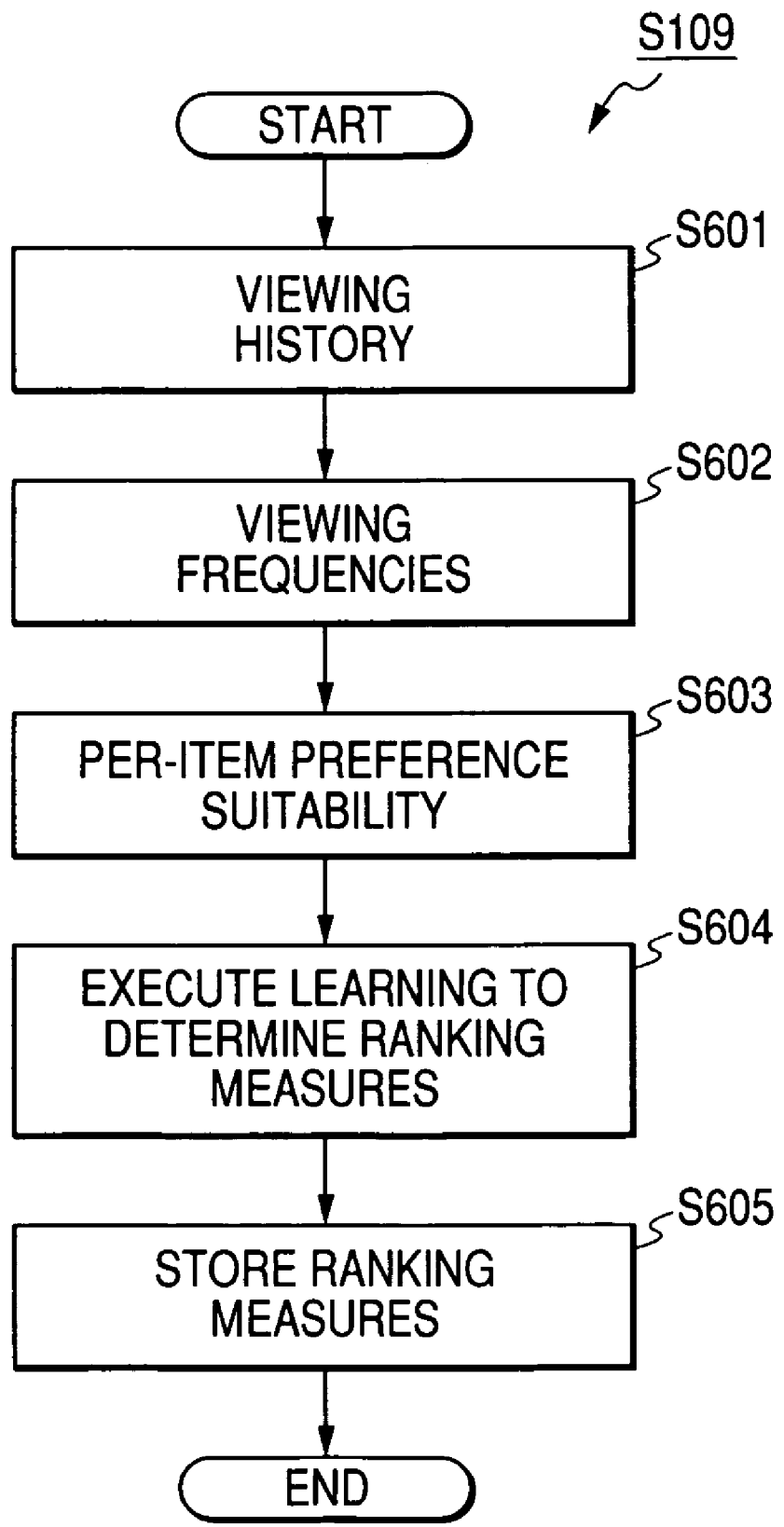
FIG. 13 is a flowchart of the details of a fifth step in FIG. 3.

As shown in FIG. 13, the program-ranking-reference learning step S109 has a sequence of sub-steps. With reference to FIG. 13, a first sub-step S601 in the program-ranking-reference learning step S109 follows the step S107 or the step S108 in FIG. 3. The sub-step S601 reads out the viewing history from the viewing-history storage device 111.

A sub-step S602 subsequent to the sub-step S601 reads out the viewing frequencies of broadcast programs in each of possible program pairs from the program-information storage device 104. In each program pair, one of the two broadcast programs corresponds to the viewing history, and was viewed by the user. The other broadcast program has the on-air time range same as that of the former broadcast program, and was not viewed by the user. The other broadcast program is detected by referring to the auxiliary program information in the program-information storage device 104. Thus, each program pair has a viewed broadcast program and a non-viewed broadcast program.

A sub-step S603 following the sub-step S602 retrieves the per-item degrees of the suitability of user's preference for the broadcast programs in each of the possible program pairs.

A sub-step S604 subsequent to the sub-step S603 sets the per-item suitability degree and the viewing frequency of the viewed broadcast program in each of the possible program pairs as training input values of one of the programs "1" and "2" (see FIG. 11). The sub-step S604 sets the per-item suitability degree and the viewing frequency of the non-viewed broadcast program in each of the possible program pairs as training input values of the other of the programs "1" and "2" (see FIG. 11). The sub-step S604 sets desired output values to reflect the fact that the user selected the viewed broadcast program rather than the non-viewed broadcast program for each of the possible program pairs. The sub-step S604 subjects the artificial neural network to the backpropagation while successively and cyclically applying the sets of the training input values and the desired output values to the artificial neural network, and adjusting the weights and the threshold values of the neurons therein. As a result of the backpropagation, the sub-step S604 determines desired weights and threshold values of the neurons which form new program ranking measures. Thus, the sub-step S604 determines the new program ranking measures. The sub-step S604 replaces the old program ranking measures with the new ones to implement updating.

A sub-step S605 following the sub-step S604 stores information representative of the new program ranking measures into a memory within the program-ranking-reference learning block 204. The sub-step S605 is succeeded by the step S110 in FIG. 3.

The program selecting block 206 and the step S113 of automatically selecting ones from all the future broadcast programs represented by the auxiliary program information will be described in more detail below. The program selecting block 206 implements the program selecting step S113.

First, possible pairs of future broadcast programs are prepared. The future broadcast programs are detected by, for example, referring to the auxiliary program information in the program-information storage device 104. The estimated viewing frequencies of the future broadcast programs are read out from the program-information storage device 104. The retrieval is made as to the per-item degrees of the suitability of user's preference for the broadcast programs, and also the program ranking measures (the desired weights and threshold values of the neurons). The neurons in the artificial neural network of FIG. 11 are loaded with the program ranking measures (the desired weights and threshold values). Preference count numbers are set for the respective future broadcast programs. Initially, the preference count numbers are equal to 0. The per-item suitability degrees and the estimated viewing frequencies of the future broadcast programs in each of the possible pairs are fed to the artificial neural network of FIG. 11 as input values of the programs "1" and "2". Detection is made as to output values generated by the neurons o1 and o2 (see FIG. 11) in the output layer which respond to the input values. Specifically, the logic states of the output values are detected. When the output values generated by the neurons o1 and o2 are 1 and 0 respectively, it is decided that the user prefers the program "1" to the program "2". In this case, the preference count number for the future broadcast program corresponding to the program "1" is incremented. When the output values generated by the neurons o1 and o2 are 0 and 1 respectively, it is decided that the user prefers the program "2" to the program "1". In this case, the preference count number for the future broadcast program corresponding to the program "2" is incremented. After the above procedure for all the possible program pairs is completed, the future broadcast programs are arranged with respect to preference count number in a manner such that the future broadcast program corresponding to the greatest preference count number occupies the first place. Ones which occupy former places in the program arrangement are selected from the future broadcast programs. Preferably, the number of the selected future broadcast programs is predetermined. The output device 108 is controlled to indicate the selected future broadcast programs as a list of recommended ones. In this case, the number of the selected future broadcast programs is previously chosen to suit for the indication of the recommended program list. Reservations may be made for the automatically recording of the selected future broadcast programs. In this case, overlap among the on-air time ranges of the future broadcast programs is checked. Then, ones which occupy former places in the program arrangement and which do not overlap in on-air time range are selected from the future broadcast programs. Preferably, the usable recording capacity (the remaining recording capacity) in the audio-visual-signal storage device 107 is checked. When the usable recording capacity in the audio-visual-signal storage device 107 is insufficient, that is when the usable recording capacity is smaller than a prescribed level, the number of the selected future broadcast programs is reduced from the normal.

Figure 14:
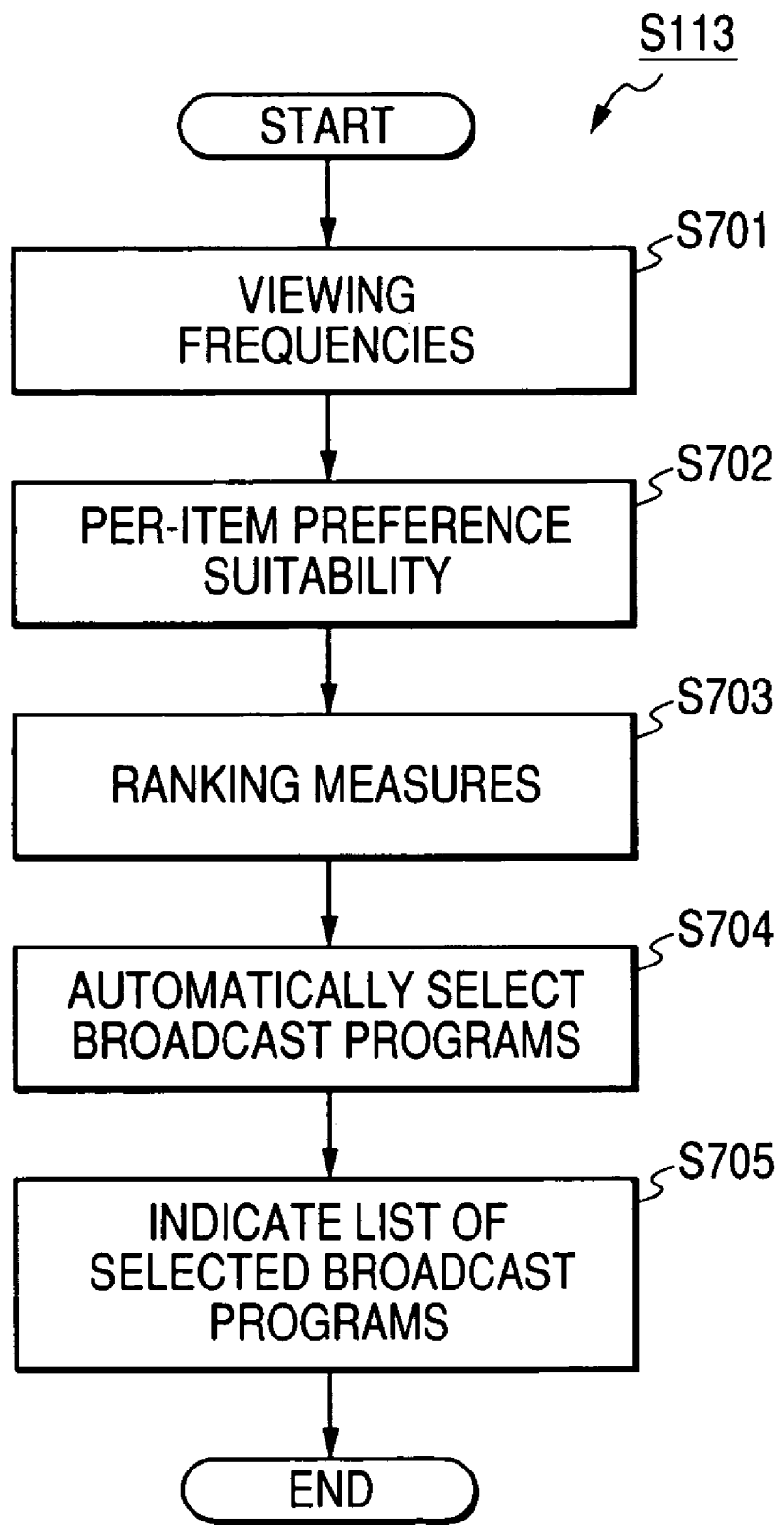
FIG. 14 is a flowchart of the details of a sixth step in FIG. 3.

As shown in FIG. 14, the program selecting step S113 has a sequence of sub-steps. With reference to FIG. 14, a first sub-step S701 in the program selecting step S113 follows the step S112 in FIG. 3. The sub-step S701 reads out the estimated viewing frequencies of future broadcast programs from the program-information storage device 104. The future broadcast programs are detected by, for example, referring to the auxiliary program information in the program-information storage device 104.

A sub-step S702 subsequent to the sub-step S701 retrieves the per-item degrees of the suitability of user's preference for the future broadcast programs.

A sub-step S703 following the sub-step S702 retrieves the program ranking measures (the desired weights and threshold values of the neurons).

A sub-step S704 subsequent to the sub-step S703 loads the neurons in the artificial neural network of FIG. 11 with the program ranking measures (the desired weights and threshold values). The sub-step S704 sets preference count numbers for the respective future broadcast programs. Initially, the preference count numbers are equal to 0. The sub-step S704 prepares possible pairs of the future broadcast programs. The sub-step S704 feeds the per-item suitability degrees and the viewing frequencies of the future broadcast programs in each of the possible pairs to the artificial neural network of FIG. 11 as input values of the programs "1" and "2". The sub-step S704 detects output values generated by the neurons o1 and o2 (see FIG. 11) in the output layer which respond to the input values. Specifically, the sub-step S704 detects the logic states of the output values. When the output values generated by the neurons o1 and o2 are 1 and 0 respectively, the sub-step S704 decides that the user prefers the program "1" to the program "2". In this case, the sub-step S704 increments the preference count number for the future broadcast program corresponding to the program "1". When the output values generated by the neurons o1 and o2 are 0 and 1 respectively, the sub-step S704 decides that the user prefers the program "2" to the program "1". In this case, the sub-step S704 increments the preference count number for the future broadcast program corresponding to the program "2". After the above procedure for all the possible program pairs is completed, the sub-step S704 arranges the future broadcast programs with respect to preference count number in a manner such that the future broadcast program corresponding to the greatest preference count number occupies the first place. The sub-step S704 selects ones from the future broadcast programs which occupy former places in the program arrangement. Preferably, the number of the selected future broadcast programs is predetermined. The sub-step S704 may select ones from the future broadcast programs which correspond to preference count numbers equal to or greater than a predetermined number. Alternatively, the sub-step S704 may select only one from the future broadcast programs which corresponds to the greatest preference count number.

A sub-step S705 following the sub-step S704 controls the output device 108 to indicate the selected future broadcast programs as a list of recommended ones. Preferably, on the display screen of the output device 108, the indicated recommended broadcast programs are arranged with respect to preference count number. Alternatively, the indicated recommended broadcast programs may be arranged with respect to scheduled on-air date and time. The sub-step S705 may make a reservation for the automatically recording of the selected future broadcast program corresponding to the greatest preference count number by, for example, providing suitable recording management information to the recording-management-information storage device 110. The sub-step S705 is the last one in the program selecting step S113.

The embodiment of this invention may be modified as follows. According to a first modification, weekly broadcast programs watched by the user with low degrees of concentration are used for the analysis of user's preference. According to a second modification, weekly broadcast programs watched by the user with low degrees of concentration are used for the analysis of user's preference while the viewing frequencies are excluded therefrom. According to a third modification, after the future broadcast programs are arranged with respect to preference count number, the selection of recommended ones from the future broadcast programs in the program arrangement is not executed.

It should be noted that the television broadcast system in the embodiment of this invention is of either the digital type or the analog type. In the case of the analog television broadcast system, program-related information such as "G-GUIDE" provided by an electronic program guide service company is used as the auxiliary program information.

What is claimed is:

1. An apparatus for ranking broadcast programs accompanied with auxiliary program information, comprising:

first means for generating a viewing history about broadcast programs viewed by a user in the past;

second means for obtaining auxiliary program information accompanying broadcast programs;

third means for calculating at least a degree of suitability of user's preference for each of the broadcast programs from the viewing history generated by the first means and the auxiliary program information obtained by the second means;

fourth means for setting decision measures in response to the suitability degrees calculated by the third means for the respective broadcast programs and the viewing history generated by the first means, the decision measures being for decisions each about which of two of future broadcast programs more suits to user's preference; and fifth means for ranking the future broadcast programs in response to the decision measures set by the fourth means;

wherein the fourth means comprises (1) means for selecting one from past broadcast programs corresponding to the viewing history as a viewed broadcast program, (2) means for setting the suitability degree for the viewed broadcast program as first information, (3) means for setting the suitability degree for a non-viewed broadcast program not viewed by the user and having an on-air time range equal to that of the viewed broadcast program as second information, (4) means for generating third information representing that the user selected the viewed broadcast program rather than the non-viewed broadcast program, (5) means for applying the operation of the means (1), (2), (3), and (4) to each of all possible pairs of viewed broadcast programs and non-viewed broadcast programs to obtain the first information, the second information, and the third information for all the possible pairs, and (6) means for setting the decision measures in response to the obtained first, second, and third information; and wherein the fifth means comprises (7) means for selecting two from the future broadcast programs as paired future broadcast programs, (8) means for deciding which of the paired future broadcast programs more suits to user's preference in response to the suitability degrees for the paired future broadcast programs and the decision measures, (9) means for applying the operation of the means (7) and (8) to each of all possible pairs of the future broadcast programs to obtain results of the deciding, (10) means for calculating a per-program number of times each of the future broadcast programs is decided to more suit to user's preference by referring to the obtained results of the deciding, and (11) means for ranking the future broadcast programs in accordance with the calculated per-program numbers of times.

2. An apparatus as recited in claim 1, further comprising sixth means for calculating a frequency of viewing of each of broadcast programs corresponding to the auxiliary program information on the basis of the viewing history, and wherein the fourth means comprises (1) means for selecting one from the past broadcast programs corresponding to the viewing history as a viewed broadcast program, (2) means for setting the suitability degree for the viewed broadcast program and the viewing frequency of the viewed broadcast program as first information, (3) means for setting the suitability degree for a non-viewed broadcast program not viewed by the user and having an on-air time range equal to that of the viewed broadcast program, and the viewing frequency of the non-viewed broadcast program as second information, (4) means for generating third information representing that the user selected the viewed broadcast program rather than the non-viewed broadcast program, (5) means for applying the operation of the means (1), (2), (3), and (4) to each of all possible pairs of viewed broadcast programs and non-viewed broadcast programs to obtain the first information, the second information, and the third information for all the possible pairs, and (6) means for setting the decision measures in response to the obtained first, second, and third information, and wherein the fifth means comprises (7) means for selecting two from the future broadcast programs as paired future broadcast programs, (8) means for deciding which of the paired future broadcast programs more suits to user's preference in response to the suitability degrees for the paired future broadcast programs, the viewing frequencies of past broadcast programs corresponding to the paired future broadcast programs, and the decision measures, (9) means for applying the operation of the means (7) and (8) to each of all possible pairs of the future broadcast programs to obtain results of the deciding, (10) means for calculating a per-program number of times each of the future broadcast programs is decided to more suit to user's preference by referring to the obtained results of the deciding, and (11) means for ranking the future broadcast programs in accordance with the calculated per-program numbers of times.

3. An apparatus as recited in claim 2, further comprising:

seventh means for detecting ones among the broadcast programs corresponding to the auxiliary program information which have the viewing frequencies greater than a predetermined threshold value; and eighth means for preventing the broadcast programs detected by the seventh means from being used by the fourth means and the fifth means.

4. An apparatus for ranking broadcast programs accompanied with auxiliary program information having a plurality of items per broadcast program, each of the items having at least one or more attribute values, the apparatus comprising:

first means for generating a viewing history about broadcast programs viewed by a user in the past;

second means for obtaining auxiliary program information accompanying broadcast programs;

third means for calculating frequencies of appearance of the attribute values in the items regarding the broadcast programs corresponding to the viewing history;

fourth means for calculating degrees of user's preference for the respective broadcast programs corresponding to the auxiliary program information from the appearance frequencies calculated by the third means for each of the attribute values;

fifth means for adding the preference degrees calculated by the fourth means on an item-by-item basis to generate degrees of suitability of user's preference for the respective broadcast programs;

sixth means for setting decision measures in response to the suitability degrees generated by the fifth means for the respective broadcast programs and the viewing history generated by the first means, the decision measures being for decisions each about which of two of future broadcast programs more suits to user's preference; and seventh means for ranking the future broadcast programs in response to the decision measures set by the sixth means;

wherein the sixth means comprises (1) means for selecting one from past broadcast programs corresponding to the viewing history as a viewed broadcast program, (2) means for setting the suitability degree for the viewed broadcast program as first information, (3) means for setting the suitability degree for a non-viewed broadcast program not viewed by the user and having an on-air time range equal to that of the viewed broadcast program as second information, (4) means for generating third information representing that the user selected the viewed broadcast program rather than the non-viewed broadcast program, (5) means for applying the operation of the means (1), (2), (3), and (4) to each of all possible pairs of viewed broadcast programs and non-viewed broadcast programs to obtain the first information, the second information, and the third information for all the possible pairs, and (6) means for setting the decision measures in response to the obtained first, second, and third information; and wherein the seventh means comprises (7) means for selecting two from the future broadcast programs as paired future broadcast programs, (8) means for deciding which of the paired future broadcast programs more suits to user's preference in response to the suitability degrees for the paired future broadcast programs and the decision measures, (9) means for applying the operation of the means (7) and (8) to each of all possible pairs of the future broadcast programs to obtain results of the deciding, (10) means for calculating a per-program number of times each of the future broadcast programs is decided to more suit to user's preference by referring to the obtained results of the deciding, and (11) means for ranking the future broadcast programs in accordance with the calculated per-program numbers of times.

5. An apparatus as recited in claim 4, further comprising eighth means for calculating a frequency of viewing of each of broadcast programs corresponding to the auxiliary program information on the basis of the viewing history, and wherein the sixth means comprises (1) means for selecting one from the past broadcast programs corresponding to the viewing history as a viewed broadcast program, (2) means for setting the suitability degree for the viewed broadcast program and the viewing frequency of the viewed broadcast program as first information, (3) means for setting the suitability degree for a non-viewed broadcast program not viewed by the user and having an on-air time range equal to that of the viewed broadcast program, and the viewing frequency of the non-viewed broadcast program as second information, (4) means for generating third information representing that the user selected the viewed broadcast program rather than the non-viewed broadcast program, (5) means for applying the operation of the means (1), (2), (3), and (4) to each of all possible pairs of viewed broadcast programs and non-viewed broadcast programs to obtain the first information, the second information, and the third information for all the possible pairs, and (6) means for setting the decision measures in response to the obtained first, second, and third information, and wherein the seventh means comprises (7) means for selecting two from the future broadcast programs as paired future broadcast programs, (8) means for deciding which of the paired future broadcast programs more suits to user's preference in response to the suitability degrees for the paired future broadcast programs, the viewing frequencies of past broadcast programs corresponding to the paired future broadcast programs, and the decision measures, (9) means for applying the operation of the means (7) and (8) to each of all possible pairs of the future broadcast programs to obtain results of the deciding, (10) means for calculating a per-program number of times each of the future broadcast programs is decided to more suit to user's preference by referring to the obtained results of the deciding, and (11) means for ranking the future broadcast programs in accordance with the calculated per-program numbers of times.

6. An apparatus as recited in claim 5, further comprising:
ninth means for detecting ones among the broadcast programs corresponding to the auxiliary program information which have the viewing frequencies greater than a predetermined threshold value; and
tenth means for preventing the broadcast programs detected by the ninth means from being used by the sixth means and the seventh means.

7. A method for ranking broadcast programs in an automatic program selecting apparatus including an information storage device having stored therein broadcast programs accompanied with auxiliary program information, the method comprising the steps of:

obtaining auxiliary program information accompanying broadcast programs;
calculating at least a degree of suitability of user's preference for each of the broadcast programs from the viewing history and the auxiliary program information;
setting decision measures in response to the suitability degrees for the respective broadcast programs and the viewing history, the decision measures being for decisions each about which of two of future broadcast programs more suits to user's preference; and
ranking the future broadcast programs in response to the decision measures;
wherein the decision-reference setting step comprises (1) selecting one from past broadcast programs corresponding to the viewing history as a viewed broadcast program, (2) setting the suitability degree for the viewed broadcast program as first information, (3) setting the suitability degree for a non-viewed broadcast program not viewed by the user and having an on-air time range equal to that of the viewed broadcast program as second information, (4) generating third information representing that the user selected the viewed broadcast program rather than the non-viewed broadcast program, (5) applying the operation (1), (2), (3), and (4) to each of all possible pairs of viewed broadcast programs and non-viewed broadcast programs to obtain the first information, the second information, and the third information for all the possible pairs, and (6) setting the decision measures in response to the obtained first, second, and third information; and
wherein the ranking step comprises (7) selecting two from the future broadcast programs as paired future broadcast programs, (8) deciding which of the paired future broadcast programs more suits to user's preference in response to the suitability degrees for the paired future broadcast programs and the decision measures, (9) applying the operation (7) and (8) to each of all possible pairs of the future broadcast programs to obtain results of the deciding, (10) calculating a per-program number of times each of the future broadcast programs is decided to more suit to user's preference by referring to the obtained results of the deciding, and (11) ranking the future broadcast programs in accordance with the calculated per-program numbers of times.

8. The method as recited in claim 7, further comprising the step of calculating a frequency of viewing of each of broadcast programs corresponding to the auxiliary program information on the basis of the viewing history, and wherein the decision-reference setting step comprises (1) selecting one from the past broadcast programs corresponding to the viewing history as a viewed broadcast program, (2) setting the suitability degree for the viewed broadcast program and the viewing frequency of the viewed broadcast program as first information, (3) setting the suitability degree for a non-viewed broadcast program not viewed by the user and having an on-air time range equal to that of the viewed broadcast program, and the viewing frequency of the non-viewed broadcast program as second information, (4) generating third information representing that the user selected the viewed broadcast program rather than the non-viewed broadcast program, (5) applying the operation (1), (2), (3), and (4) to each of all possible pairs of viewed broadcast programs and non-viewed broadcast programs to obtain the first information, the second information, and the third information for all the possible pairs, and (6) setting the decision measures in response to the obtained first, second, and third information, and wherein the ranking step comprises (7) selecting two from the future broadcast programs as paired future broadcast programs, (8) deciding which of the paired future broadcast programs more suits to user's preference in response to the suitability degrees for the paired future broadcast programs, the viewing frequencies of past broadcast programs corresponding to the paired future broadcast programs, and the decision measures, (9) applying the operation (7) and (8) to each of all possible pairs of the future broadcast programs to obtain results of the deciding, (10) calculating a per-program number of times each of the future broadcast programs is decided to more suit to user's preference by referring to the obtained results of the deciding, and (11) ranking the future broadcast programs in accordance with the calculated per-program numbers of times.

9. The method as recited in claim 8, further comprising the steps of:
   detecting ones among the broadcast programs corresponding to the auxiliary program information which have the viewing frequencies greater than a predetermined threshold value; and
   preventing the detected broadcast programs from being used by the decision-reference setting step and the ranking step.

10. A method for ranking broadcast programs in an automatic program selecting apparatus including an information storage device having stored therein broadcast programs accompanied with auxiliary program information, wherein the auxiliary program information comprises a plurality of items per broadcast program, each of the items having at least one or more attribute values, the method comprising the steps of:
   generating a viewing history about broadcast programs viewed by a user in the past;
   obtaining auxiliary program information accompanying broadcast programs;
   calculating frequencies of appearance of the attribute values in the items regarding the broadcast programs corresponding to the viewing history;
   calculating degrees of user's preference for the respective broadcast programs corresponding to the auxiliary program information from the appearance frequencies for each of the attribute values;
   adding the preference degrees on an item-by-item basis to generate degrees of suitability of user's preference for the respective broadcast programs;
   setting decision measures in response to the suitability degrees for the respective broadcast programs and the viewing history, the decision measures being for decisions each about which of two of future broadcast programs more suits to user's preference; and
   ranking the future broadcast programs in response to the decision measures;
   wherein the decision-reference setting step comprises (1) selecting one from past broadcast programs corresponding to the viewing history as a viewed broadcast program, (2) setting the suitability degree for the viewed broadcast program as first information, (3) setting the suitability degree for a non-viewed broadcast program not viewed by the user and having an on-air time range equal to that of the viewed broadcast program as second information, (4) generating third information representing that the user selected the viewed broadcast program rather than the non-viewed broadcast program, (5) applying the operation (1), (2), (3), and (4) to each of all possible pairs of viewed broadcast programs and non-viewed broadcast programs to obtain the first information, the second information, and the third information for all the possible pairs, and (6) setting the decision measures in response to the obtained first, second, and third information; and
   wherein the ranking step comprises (7) selecting two from the future broadcast programs as paired future broadcast programs, (8) deciding which of the paired future broadcast programs more suits to user's preference in response to the suitability degrees for the paired future broadcast programs and the decision measures, (9) applying the operation of the means (8) and (9) to each of all possible pairs of the future broadcast programs to obtain results of the deciding, (10) calculating a per-program number of times each of the future broadcast programs is decided to more suit to user's preference by referring to the obtained results of the deciding, and (11) ranking the future broadcast programs in accordance with the calculated per-program numbers of times.

11. The method as recited in claim 10, further comprising the step of calculating a frequency of viewing of each of broadcast programs corresponding to the auxiliary program information on the basis of the viewing history, and wherein the decision-reference setting step comprises (1) selecting one from the past broadcast programs correspond to the viewing history as a viewed broadcast program, (2) setting the suitability degree for the viewed broadcast program and the viewing frequency of the viewed broadcast program as first information, (3) setting the suitability degree for a non-viewed broadcast program not viewed by the user and having an on-air time range equal to that of the viewed broadcast program, and the viewing frequency of the non-viewed broadcast program as second information, (4) generating third information representing that the user selected the viewed broadcast program rather than the non-viewed broadcast program, (5) applying the operation (1), (2), (3), and (4) to each of all possible pairs of viewed broadcast programs and non-viewed broadcast programs to obtain the first information, the second information, and the third information for all the possible pairs, and (6) setting the decision measures in response to the obtained first, second, and third information, and wherein the ranking step comprises (7) selecting two from the future broadcast programs as paired future broadcast programs, (8) deciding which of the paired future broadcast programs more suits to user's preference in response to the suitability degrees for the paired future broadcast programs, the viewing frequencies of past broadcast programs corresponding to the paired future broadcast programs, and the decision measures, (9) applying the operation (7) and (8) to each of all possible pairs of the future broadcast programs to obtain results of the deciding, (10) calculating a per-program number of times each of the future broadcast programs is decided to more suit to user's preference by referring to the obtained results of the deciding, and (11) ranking the future broadcast programs in accordance with the calculated per-program numbers of times.

12. The method as recited in claim 11, further comprising the steps of:
   detecting ones among the broadcast programs corresponding to the auxiliary program information which have the viewing frequencies greater than a predetermined threshold value; and
   preventing the detected broadcast programs from being used by the decision-reference setting step and the ranking step.

13. An apparatus for ranking broadcast programs, comprising:
- first means for detecting frequencies of viewing of first weekly broadcast programs by a user in connection with past sections of the first weekly broadcast programs;
- second means for detecting at least one among the first weekly broadcast programs which has the detected viewing frequency greater than a predetermined threshold value;
- third means for excluding the one detected by the second means from the first weekly broadcast programs to get second weekly broadcast programs;
- fourth means for obtaining attributes of the past sections of the second weekly broadcast programs;
- fifth means for detecting which of the past sections of the second weekly broadcast programs were viewed by the user;
- sixth means for generating program ranking measures representative of a relation between program attributes and user's preference in response to (1) the obtained attributes of the past sections of the second weekly broadcast programs and (2) which of the past sections of the second weekly broadcast programs were viewed by the user;
- seventh means for obtaining attributes of future sections of the second weekly broadcast programs; and
- eighth means for ranking the future sections of the second weekly broadcast programs in response to (1) the generated program ranking measures and (2) the obtained attributes of the future sections of the second weekly broadcast programs.

14. A method for ranking broadcast programs in an automatic program selecting apparatus including an information storage device having stored therein broadcast programs accompanied with auxiliary program information, the method comprising the steps of:
- detecting frequencies of viewing of first weekly broadcast programs by a user in connection with past sections of the first weekly broadcast programs;
- detecting at least one among the first weekly broadcast programs which has the detected viewing frequency greater than a predetermined threshold value;
- excluding the detected one from the first weekly broadcast programs to get second weekly broadcast programs;
- obtaining attributes of the past sections of the second weekly broadcast programs;
- detecting which of the past sections of the second weekly broadcast programs were viewed by the user;
- generating program ranking measures representative of a relation between program attributes and user's preference in response to (1) the obtained attributes of the past sections of the second weekly broadcast programs and (2) which of the past sections of the second weekly broadcast programs were viewed by the user;
- obtaining attributes of future sections of the second weekly broadcast programs; and
- ranking the future sections of the second weekly broadcast programs in response to (1) the generated program ranking measures and (2) the obtained attributes of the future sections of the second weekly broadcast programs.

* * * * *